(12) United States Patent
Milinusic et al.

(10) Patent No.: US 7,242,295 B1
(45) Date of Patent: Jul. 10, 2007

(54) SECURITY DATA MANAGEMENT SYSTEM

(75) Inventors: Tomislav F. Milinusic, Edmonton (CA); Demetrios Papacharalampos, Atlanta, GA (US); Alexander Danileiko, Suwanee, GA (US)

(73) Assignee: VistaScape Security Systems Corp., Atlanta, GA (US)

( * ) Notice: Subject to any disclaimer, the term of this patent is extended or adjusted under 35 U.S.C. 154(b) by 942 days.

(21) Appl. No.: 10/236,819

(22) Filed: Sep. 6, 2002

Related U.S. Application Data

(60) Provisional application No. 60/317,635, filed on Sep. 6, 2001.

(51) Int. Cl.
*G08B 13/00* (2006.01)
*G08B 23/00* (2006.01)
*G08B 25/00* (2006.01)
*G08B 29/00* (2006.01)
*H04N 9/47* (2006.01)
*H04N 7/18* (2006.01)

(52) U.S. Cl. .................. 340/541; 340/506; 340/520; 340/539; 340/533; 340/937; 340/988; 340/524; 348/148; 348/149; 348/152

(58) Field of Classification Search .............. 340/541, 340/506, 520, 524–525, 825.06, 825.36, 340/825.49, 511; 348/113, 143, 148–152
See application file for complete search history.

(56) References Cited

U.S. PATENT DOCUMENTS

| | | | | |
|---|---|---|---|---|
| 6,107,918 | A  * | 8/2000 | Klein et al. ................. | 340/511 |
| 6,281,790 | B1 * | 8/2001 | Kimmel et al. ............. | 340/506 |
| 6,384,414 | B1 * | 5/2002 | Fisher et al. ............ | 250/339.14 |
| 6,392,692 | B1 * | 5/2002 | Monroe ...................... | 348/143 |
| 6,545,601 | B1 * | 4/2003 | Monroe ...................... | 340/521 |
| 6,771,741 | B2 * | 8/2004 | Kliland ....................... | 379/39 |

\* cited by examiner

*Primary Examiner*—Daniel Wu
*Assistant Examiner*—Lam Pham

(57) ABSTRACT

A sensor unit for use in a surveillance system is provided. The sensor unit interfaces with a sensor device to receive sensor data from the sensor device. The sensor unit is configured to generate an event record based upon received sensor data. The event record is of a predetermined format and is output to a data unit.

21 Claims, 29 Drawing Sheets

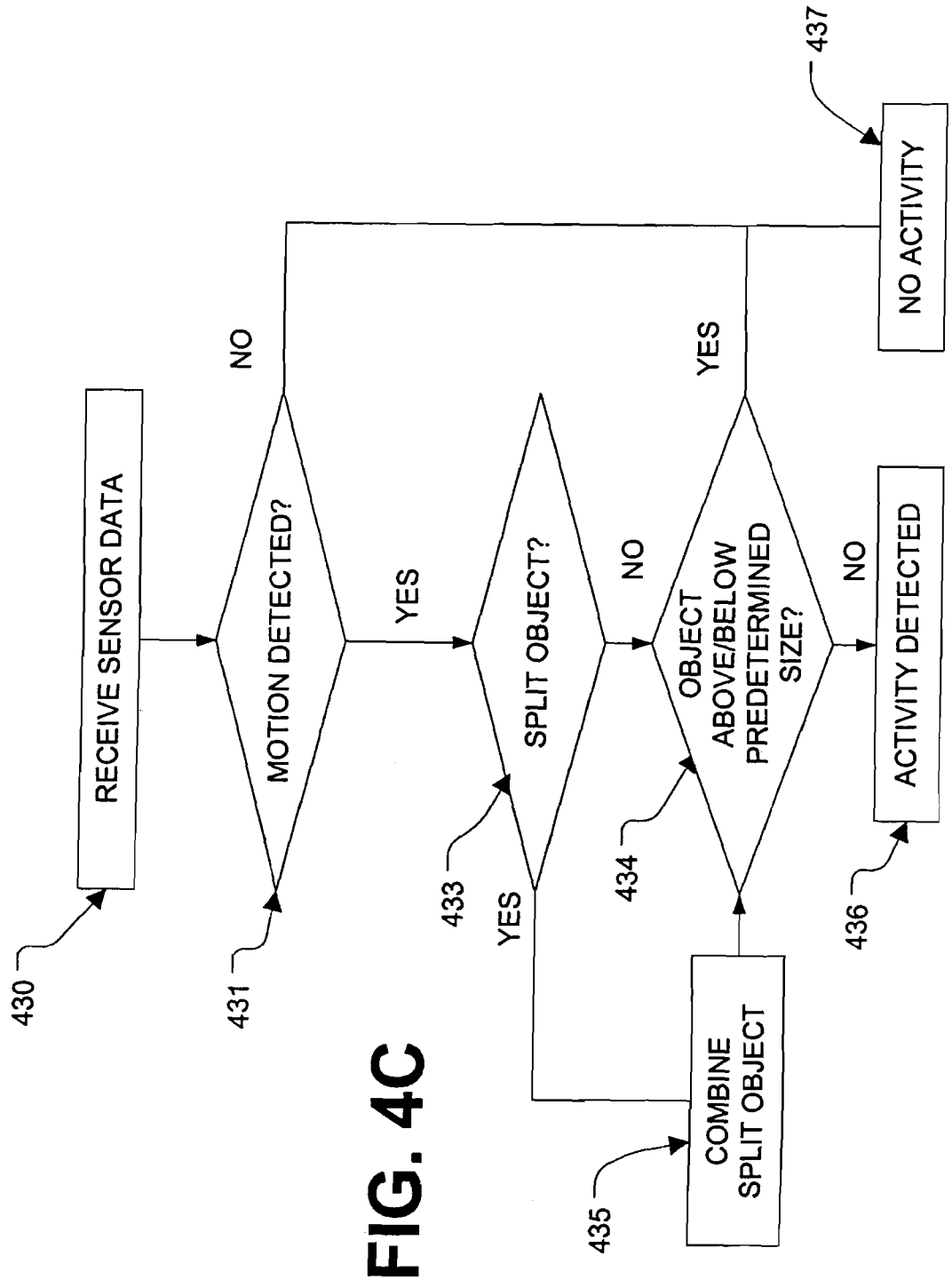

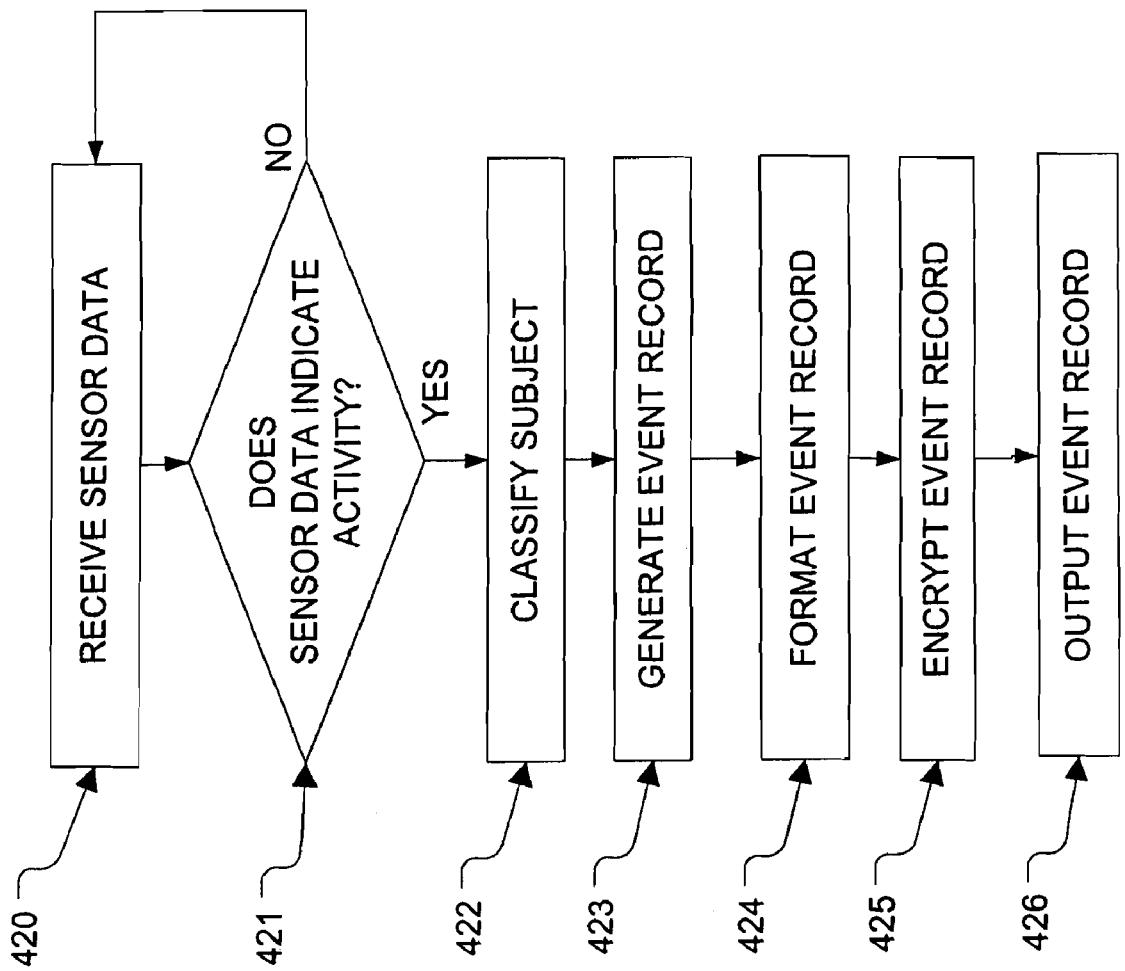

| PARAMETER | DESCRIPTION |
|---|---|
| AreaID | ID of portion of AUS |
| Sensor ID | ID of Sensor Device |
| Time | Time Stamp of the moment Surveillance Data Retrieved from Sensor Device |
| Status | Object Status ( Moving/Stationary/Movingt to BKGD/Unavailable) |
| Az | Azimuth of Sensor Device in World Coordinates |
| Tilt | Tilt of Sensor Device in World Coordinates |
| Object ID | Object ID |
| Type | Object Type |
| X | X coordinate of object in world coordinates |
| Y | Y coordinate of object in world coordinates |
| Z | Z coordinates of object in world coordinates |
| Width | Object Width in world coordinates |
| Height | Object Height in world coordinates |
| DirAz | Direction Vector of the object in world coordinates |
| Speed | Object speed in world coordinates |
| Video Status | Available/not Available |

FIG. 5A

```xml
<?xml version="1.0"?>
<schema targetNS=http://security.com/SensorData.xsd
        version="1.0"
        xmlns="http://www.w3.org/1999/XMLSchema">
   <ElementType name="ObjData" content="eltOnly" maxOccurs="1">
      <attributeType name="AreaID" type="integer" required="yes"/>
      <ElementType name="Frame" content="eltOnly" minOccurs="1" maxOccurs="1"
         <attributeType name="CamID" type="integer" required="yes"/>
         <attributeType name="Time" type="string" required="yes"/>
         <attributeType name="STATUS" type="integer" required="yes"/>
         <attributeType name="Az" type="double" required="no"/>
         <attributeType name="Tilt" type="double" required="no"/>
         <ElementType name="Object" content="empty" minOccurs="1" maxOccurs="*"
            <attributeType name="Id" type="integer" required="yes"/>
            <attributeType name="Type" type="integer" default = "0" required="no"/>
            <attributeType name="X" type="double" required="yes"/>
            <attributeType name="Y" type="double" required="yes"/>
            <attributeType name="Z" type="double" required="yes"/>
            <attributeType name="Width" type="double" default="0" required="no"/>
            <attributeType name="Height" type="double" default="0" required="no"/>
            <attributeType name="DirAz" type="double" default="0" required="no"/>
            <attributeType name="Speed" type="double" default="0" required="no"/>
      </ElementType>
   </ElementType>
</schema>
```

FIG. 5B

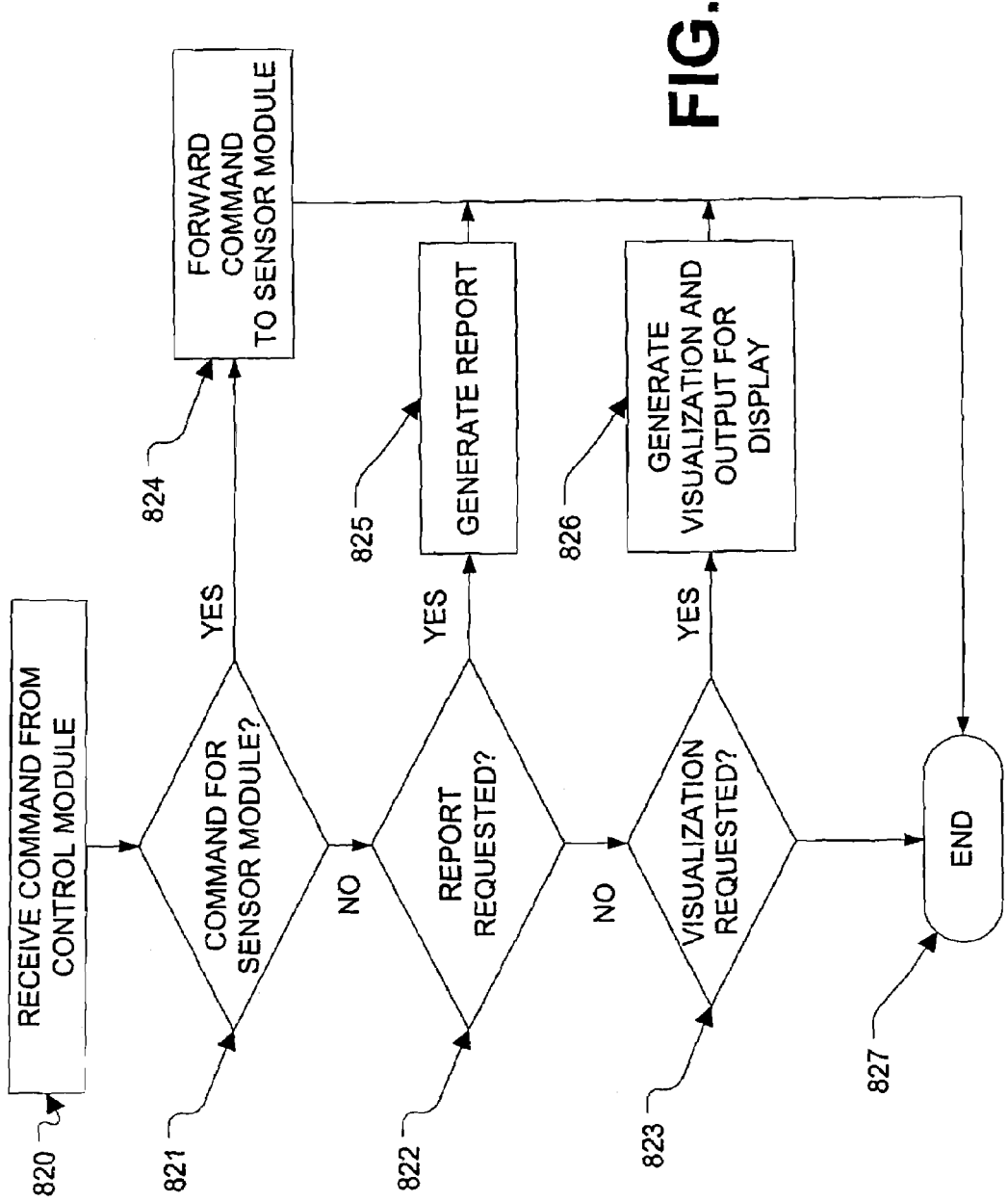

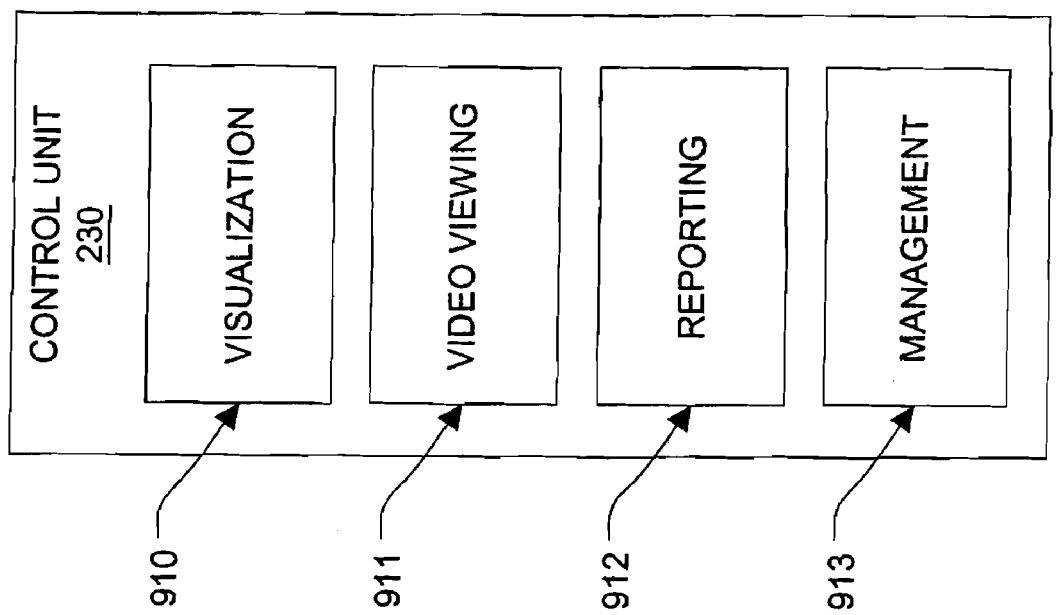

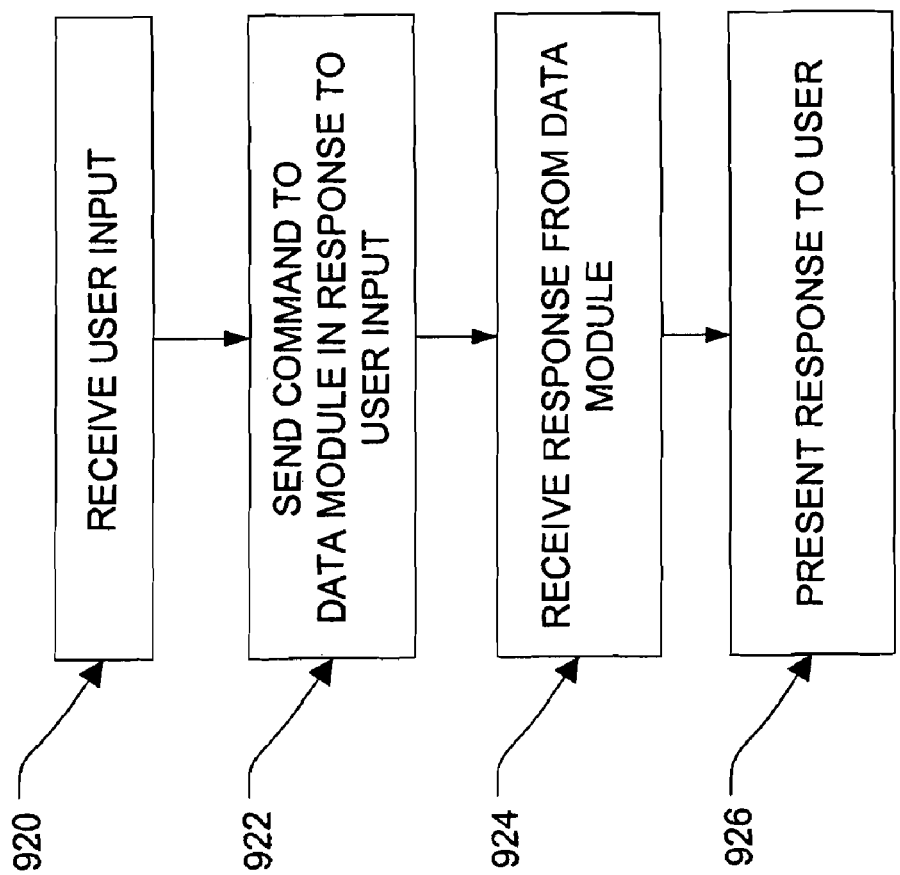

SECURITY DATA MANAGEMENT SYSTEM

CLAIM OF PRIORITY

This application claims priority to copending U.S. provisional application entitled, "SURVEILLANCE SYSTEM" having Ser. No. 60/317,635, filed Sep. 6, 2001, the disclosure of which is entirely incorporated herein by reference.

CROSS-REFERENCE TO RELATED APPLICATIONS

This application is related to copending U.S. patent application entitled "SURVEILLANCE SYSTEM DATA CENTER" filed on Sep. 6, 2002, Ser. No. 10/237,203; copending U.S. patent application entitled "SENSOR DEVICE FOR USE IN SURVEILLANCE SYSTEM" filed on Sep. 6, 2002, Ser. No. 10/236,720; and copending U.S. patent application entitled "SURVEILLANCE SYSTEM CONTROL UNIT" filed on Sep. 6, 2002, Ser. No. 10/237,202, the disclosures of which are all entirely incorporated herein by reference.

TECHNICAL FIELD

The present invention is generally related to a security system and more particularly, to a sensor unit for collecting and formatting sensor data collected from one or more sensor devices.

BACKGROUND OF THE INVENTION

In typical surveillance systems one or more sensor devices are used to capture/respond to particular conditions, changes or occurrences. Signals from the sensors devices are provided to a monitoring unit to indicate the particular condition, change or occurrence. When the monitoring unit receives these signals, an alert may be generated to advise of the detected condition/change. In the case where the sensor is, for example, an imager, such as a video camera, the signal from the sensor may be presented for display in real time on a display device and/or recorded to a recycling recording device, such as a linear video tape recorder.

Other than recording information to a recording device, no data concerning the change, condition or occurrence is collected or otherwise generated. Thus, the ability to analyze/evaluate the change, condition or occurrence is very limited. Further, the ability to take appropriate or necessary action for a given situation is also limited. In general, unless a party is available at the monitoring station to receive the alert or view information on a display; very little analysis of the condition, change or occurrence is possible. Further, the meaning or relation of the condition, change or occurrence with respect to past or future conditions, changes or occurrences is not considered or otherwise taken into account by the typical surveillance system.

Thus, a heretofore unaddressed need exists in the industry to address the aforementioned deficiencies and inadequacies.

SUMMARY OF THE INVENTION

The present invention provides a system and method for collecting surveillance data from a sensor device. Briefly described, in architecture, the system can be implemented as follows. A sensor unit is provided to receive sensor data from a sensor device. The sensor unit may be configured to provide memory for storing reference data; a controller configured to receive sensor data from a sensor device; and, network interface for connecting to a network. The controller may be further configured to generate an event record based upon the sensor data. In a further embodiment of the sensor unit, the controller may also be configured to determine activity within an area under surveillance based upon the sensor data. In yet a further embodiment, the controller may be further configured to classify a detected object based upon known object types.

The present invention can also be viewed as providing a method for managing surveillance data received from one or more sensor devices. In this regard, the method can be broadly summarized by the following steps: sensor data is received from a sensor device that is monitoring a predetermined area under surveillance (AUS). Based upon the sensor data, a determination is made as to whether or not activity has occurred in the AUS. Where activity has occurred, an event record representing the detected activity is generated. In a further embodiment, detected objects may be classified based upon known object types and such classification information may be incorporated into the event record.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4C is a flowchart illustrating a process of detecting activity carried out by one embodiment of the sensor unit 210;

FIG. 4G is a flowchart illustrating a process of generating an event record carried out by one embodiment of the sensor unit 210;

FIG. 5A is a diagram illustrating an event record 510;

FIG. 5B is a diagram illustrating an example of a schema of an event record 510;

FIG. 8C is a flowchart illustrating a process of responding to a command that is carried out by one embodiment of the data unit 220;

FIG. 9A is a block diagram illustrating one embodiment of a control module 230;

FIG. 9B is a flowchart illustrating a process of responding to user input carried out by one embodiment of the control unit 230;

DETAILED DESCRIPTION OF THE PREFERRED EMBODIMENT

The present invention provides for a security data management system. More particularly, a security data management system is provided in which data representing the occurrence of a particular activity is collected by a sensing device. An activity may be any type of predetermined condition, change or occurrence. An event record is generated, based upon the data received from the sensing device. This event record reflects the detected activity. The event record may specify, for example, the time and location of the detected activity. The event record may contain other information that may be desired and available from or concerning the particular sensing device and/or the detected activity. The data represented by an event record is incorporated into a security data model representative of a predetermined area under surveillance (AUS). The security data model may depict known features of the AUS, such as structures, objects or other features that exist within the AUS. The data of the event record is also archived into a database of security data (security database). The system also provides for analysis of the data contained in the event record.

Figure 1A:
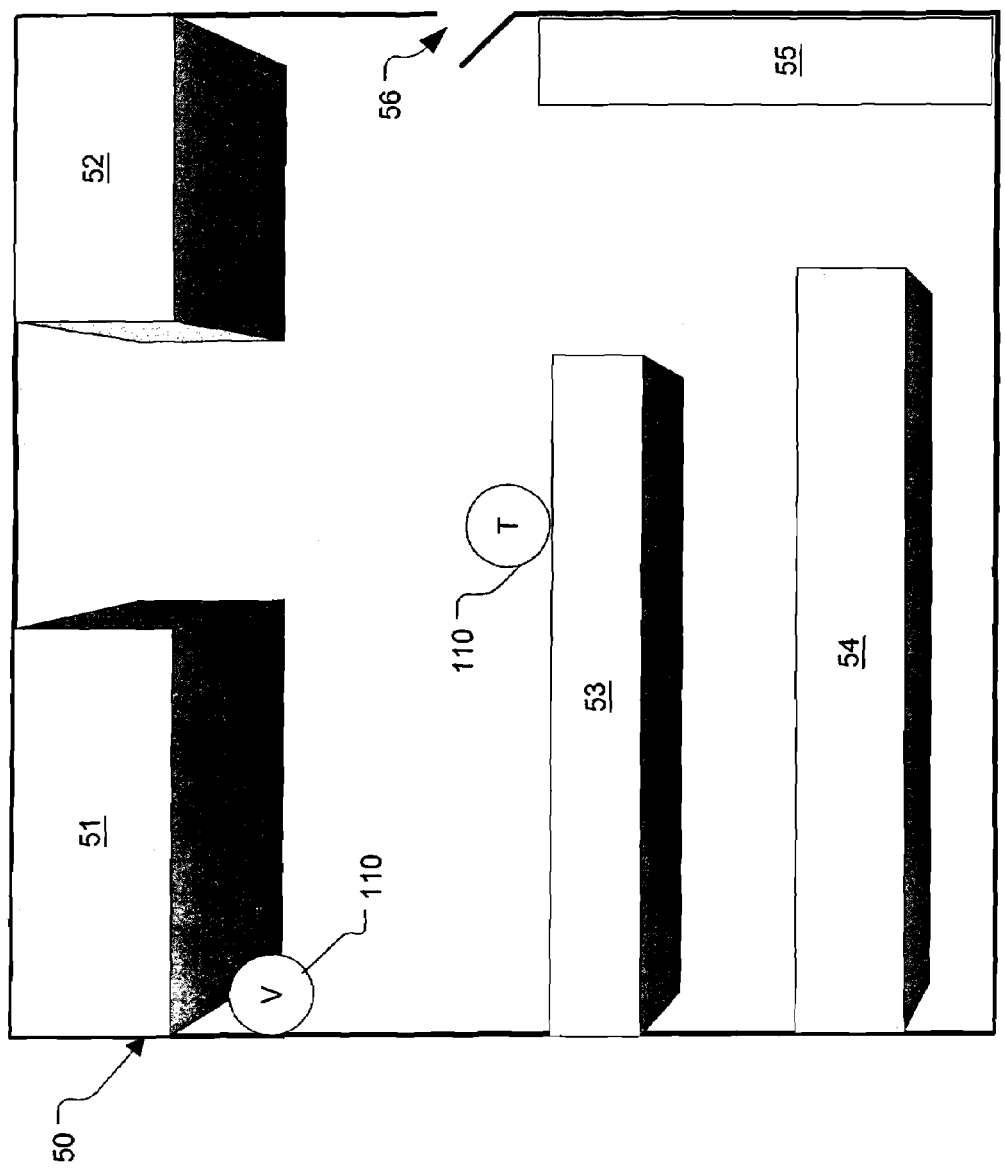
FIG. 1A is an illustration representative of an area under surveillance (AUS)

FIG. 1A illustrates an area under surveillance (AUS) 50. In this example, the illustrated AUS 50 is a warehouse, or other storage area, shown from a top-view perspective and looking down onto a series of shelves 51-55 and walking paths within the AUS 50. A doorway 56 is also provided. One or more sensor devices 110 are provided to monitor the AUS 50. The sensor devices 110 are placed in relation to the AUS 50 so as to provide for monitoring of predetermined activities within the AUS 50 or of portions thereof. In this example, it is desired to monitor the temperature of the AUS 50 as well as the activities of and around the doorway 56. In view of this, two sensor devices 110 have been employed. One sensor device 110 is implemented as a thermometer employed to measure the temperature within the AUS 50 or portions thereof. In this example the sensor 110, denoted with a "T", is provided for detecting the temperature of the AUS 50. Similarly, to detect movement of or near the doorway 56, a sensor device 110 configured as a video camera has been positioned so as to have a line of view of the doorway 56. This video camera is shown as sensor device 110 and is denoted with a "V". It will be recognized that other sensor devices could be employed to detect the noted activities, or if desired, other additional types of activities within the AUS 50.

The sensor devices 110 may be located either within the AUS 50 or near enough the AUS 50 to allow the sensor device 110 to monitor/detect activity within the AUS 50. Depending upon the circumstances, any number and/or type of sensor device 110 may be employed to monitor/detect activity within the AUS 50. Each of the sensor devices 110 is responsive to a predetermined activity and generates sensor data in response thereto. In the case of a video camera, the sensor data comprises a video signal, while, in the case of a thermometer, the sensor data comprises a signal indicative of the measured temperature. In an embodiment of the invention, this sensor data is provided to a security data management system that allows the sensor data to be usefully incorporated into an overall model representative of the AUS 50.

Figure 1B:
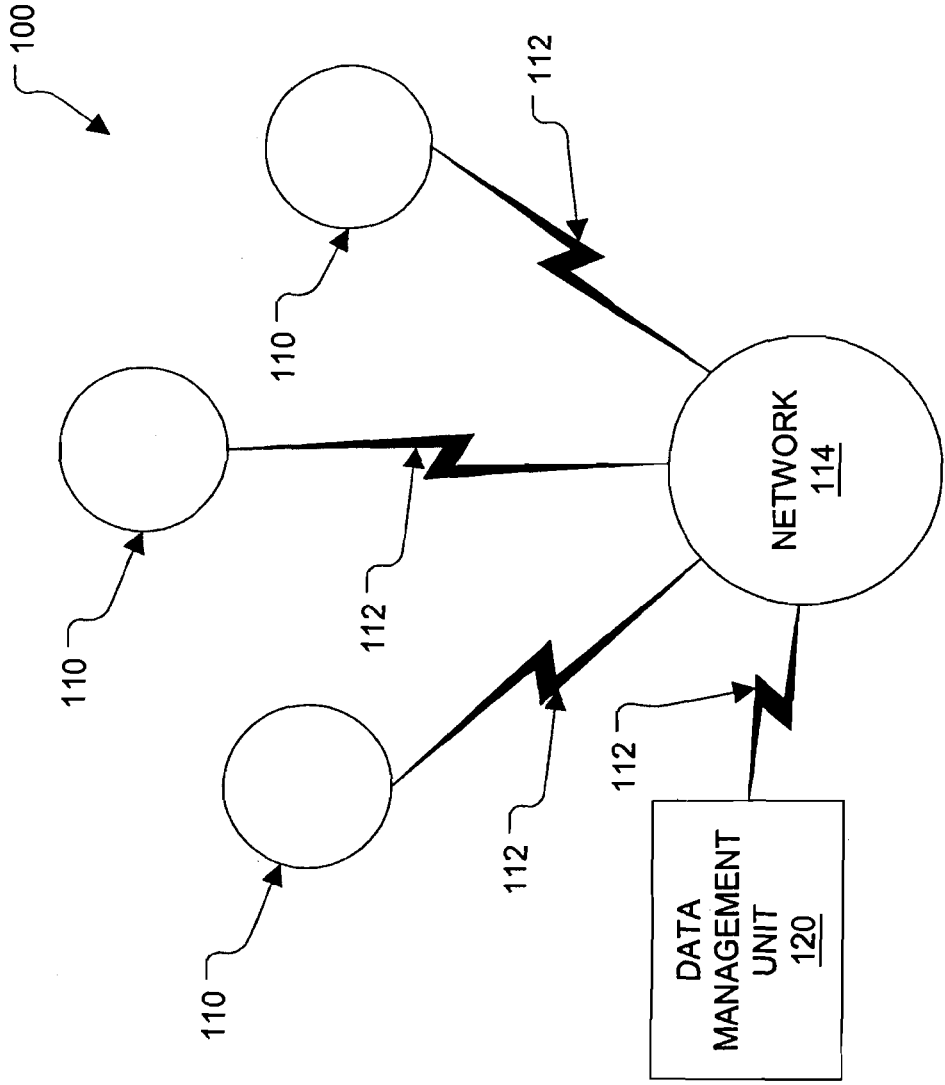
FIG. 1B is a block diagram illustrating an embodiment of a surveillance system 100.

FIG. 1B illustrates a surveillance system 100 according to the invention. This surveillance system includes one or more sensor devices 110 and a data management unit 120. The data management unit 120 may be configured to receive, store, process and/or analyze data received from each sensor device 110. The sensor device 110 and the data management unit 120 are preferably interfaced to the network 114 to exchanged data and/or commands via a network 114 through respective communication links 112.

Network 114 may be, for example, a local area network (LAN) or a wide area network (WAN), such as the Internet. Each of the communication links 112 may constitute either a wired connection, such as an electrical or optical cable connection, or a wireless connection, such as an infrared (IR), radio frequency (RF) or transmitted optical signal system.

Sensor Device

Each of the sensor devices 110 includes a sensor and is preferably configured to be responsive to a particular activity or type of activity. An activity might be any predetermined type of condition, change or occurrence. Each sensor device 110 may be positioned as desired at a location to monitor a given location. The sensor devices 110 are preferably configured to output data (sensor data) representative of an activity at a given AUS/location.

Each sensor device 110 incorporated as a part of a surveillance system 100 need not be the same type of sensor (i.e. not configured to sense the same type of conditions, changes or occurrences). Each sensor device 110 may be configured to include one or more a sensors. Each sensor may be the same type of sensor or alternatively, each sensor may be of a different type. For example, a sensor device 110 may be configured to include any type of sensor(s), including, for example but not limited to, a digital or analog imaging device; an open/close sensor for detecting, for example, the open/closed state of, a door, gate, valve, and/or switch; a video imaging device; an audio sensor, such as, for example, a microphone; a global positioning satellite (GPS) receiver or transceiver; an infrared sensor responsive to infrared radiation; a radar sensor; a sonar receiver; a thermometer; a barometric pressure sensor; biochemical sensor and/or a radio frequency receiver. In one embodiment, the sensor device 110 is configured to include more than one sensor. In a further embodiment, the sensor device 110 is configured to include sensors of different types. Of course, the sensor device may also be configured to include multiple sensors of the same type.

Each sensor device 110 is configured to generate and output one or more predetermined types of data (sensor data). For example, where a sensor device 110 is configured as an "open/close" type sensor, a signal is output by the sensor device to indicate when the device monitored by the open/close sensor is, for example, open.

Each sensor device 110 may also be configured to output data that includes a unique identifier (sensor identifier) that uniquely identifies the sensor device 110 and/or each sensor that is included in the sensor device 110. The sensor device 110 may also be configured to output data indicative of the location of the sensor device 110. Such data may be provided via, for example, a GPS receiver or read out of memory storage associated with the sensor device 110, which is provided to store data indicative of the relevant location of the sensor device 110.

The sensor device 110 may also be configured to output data that identifies the sensor device as a particular type of sensor. For example, a sensor device 110 configured as a video camera may generate data indicating that the type of the sensor device is a "camera" or "imager".

In the case where the monitored device is, for example, a door, the sensor device 110 may be configured to output data indicating when the door has been opened, closed or otherwise changed states.

In another embodiment, each sensor device 110 may be configured to include one or more sensors. For example, a sensor device 110 may include a video camera as well as a GPS receiver. The video camera generates one type of sensor data (video data), while the GPS receiver generates a separate type of sensor data (GPS position data).

Figure 2:
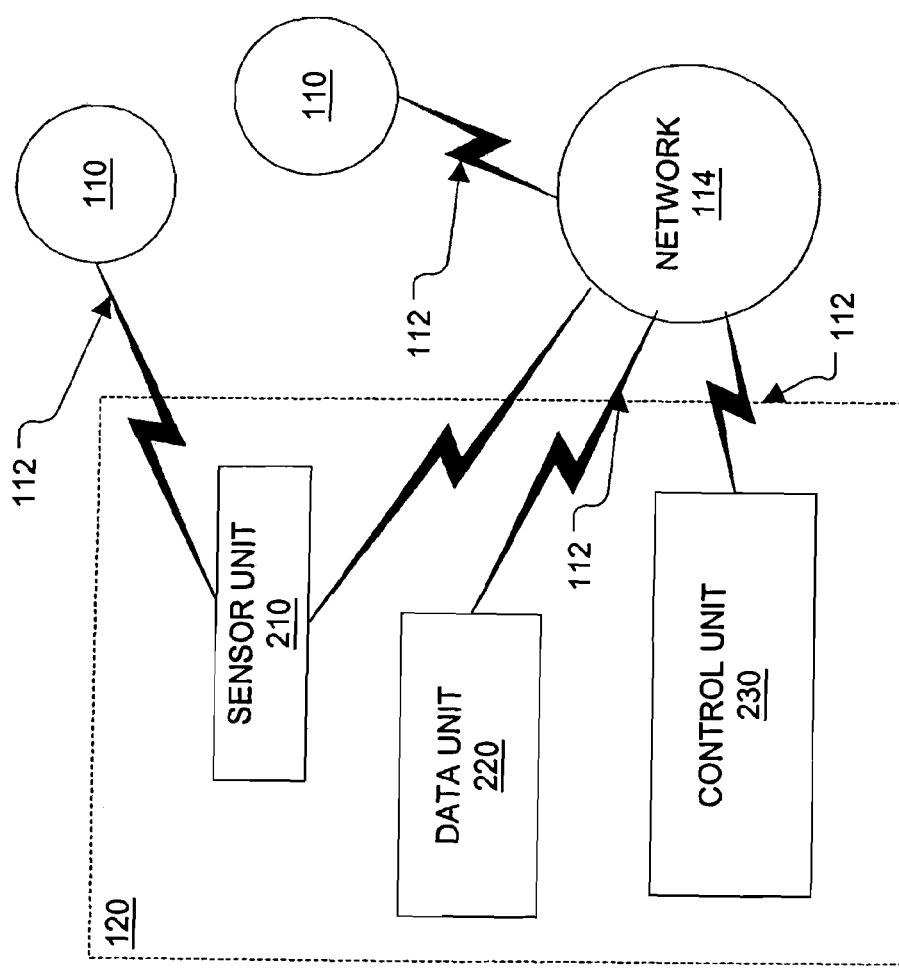
FIG. 2 is a block diagram further illustrating an embodiment of the data management unit 120 shown in FIG. 1B.

FIG. 2 is a diagram illustrating an embodiment of the data management unit 120. In this embodiment, the data management unit 120 includes a sensor unit 210, a data unit 220 and a control unit 230. Sensor unit 210, data unit 220 and control unit 230 are preferably interfaced to the network 114 via respective communication links 112 to exchange data and/or commands with each other as well as other devices on the network, such as the sensor devices 110.

Figure 3:
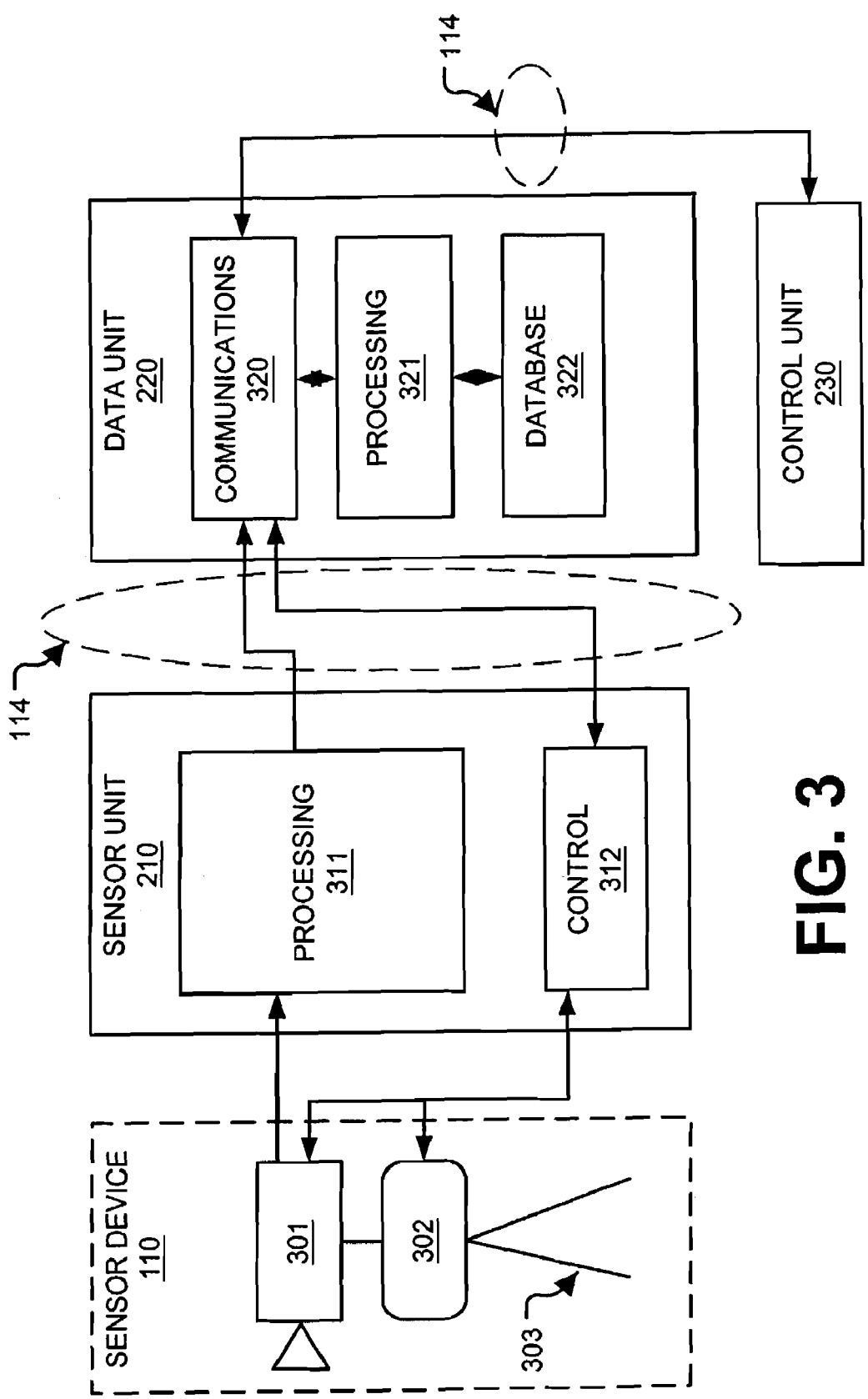
FIG. 3 is a diagram illustrating an embodiment of a surveillance system 100.

FIG. 3 is a further illustration of the surveillance system 100 (FIG. 1B). It can be seen in this illustration that sensor device 110 includes a sensor 301. In this example, sensor 301 is a video camera that is configured to optically monitor an AUS 50 (FIG. 1A) and to generate a signal(s) (sensor data) representative of the AUS 50, including activities within the AUS 50. The video camera 301 may be configured to output a video signal in any one or more video formats including but not limited to, for example, PAL, NTSC and/or SECAM. Further, the video camera 301 may be a "web cam", such as, for example, the D-LINK® Wireless Internet Camera model DCS-1000W and/or the D-LINK® Internet Camera model DCS-1000 that outputs video in a predetermined streaming digital video format. The video camera 301 may also be configured to be responsive to visible light and/or infrared radiation.

An anchor device 303 is provided to hold the sensor 301 securely at a predetermined location. An adjustable gimbal 302 is provided to allow for adjustment of the orientation of the sensor 301 in accordance with control signals received from, for example, a sensor unit 210. Sensor data is outputted by the sensor 301 and received by the sensor unit 210.

Sensor Unit

Sensor unit 210 includes a processing section 311 and a control section 312. In this example, the sensor unit 210 is interfaced with only a single sensor device 110. The sensor unit 210 may, however, be interfaced with and configured to handle surveillance data from and commands to one or more sensor devices 110, of the same and/or different type, if desired.

Figure 4A:
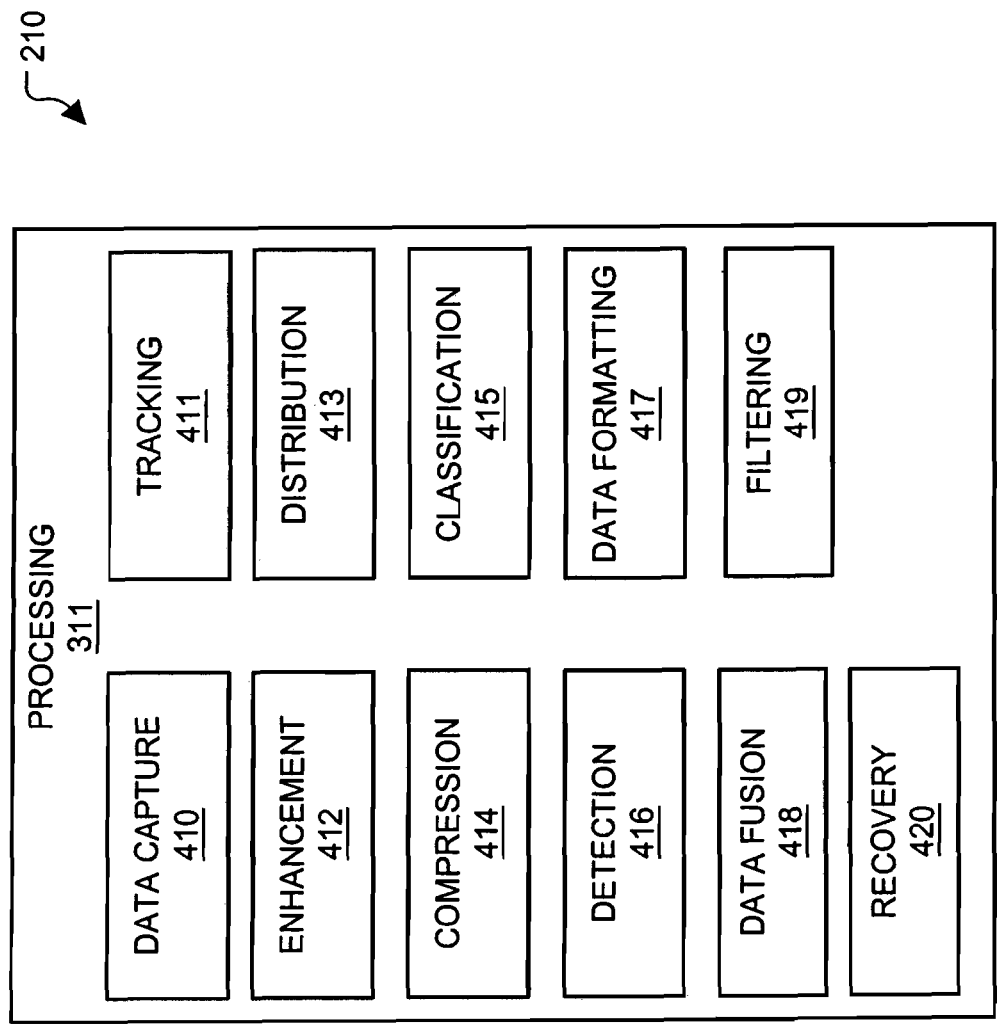
FIG. 4A is a diagram illustrating processing section 311 of the sensor unit 210.

FIG. 4A further illustrates an embodiment of processing module 311. The processing module is composed of one or more modules configured to carry out a particular function/operation. In this embodiment, the processing module 311 includes data capture module 410; tracking module 411; enhancement module 412; distribution module 413; compression module 414; classification module 415; detection module 416; data formatting module 417; sensor data fusion module 418; filtering module 419 and recovery module 420.

Data capture module 410 is configured to receive or capture sensor data from a sensor device 110. The data capture module 410 is preferably configured to convert sensor data into a predetermined format. In one embodiment, the data capture module 410 is configured to convert an analog video signal into a digital signal.

Tracking module 411 is configured to compare an event record representative of a detected object, with historical information (event records) representative of previously detected objects. If there is a match, the tracking module 411 will assign an object ID to the event record that is the same as the object ID of the matching historical information (previous event record). If there is no match, the tracking module 411 will cause a new object ID to be assigned to the event record.

Enhancement module 412 is configured to enhance sensor data. In one embodiment the enhancement module 412 is configured to carry out operations on the sensor data such as image stabilization; noise reduction and corrections for addressing predetermined types of abnormalities, such as, for example, lens distortion.

Distribution module 413 is configured to distribute surveillance data to a data unit 220 and/or an end user. In one embodiment, the distribution module is configured to publish a surveillance model to a predetermined address for access by an end user. In a further embodiment, the distribution module 413 is configured to distribute streaming content, such as streaming video or streaming audio, to an end user.

Compression module 414 is configured to compress data according to a predetermined compression scheme. In one embodiment, the compression module 414 is configured to place data of one format, such as a video format signal, into a compressed format, such as, for example, the Moving Picture Experts Group (MPEG) format MPEG-2.

Classification module 415 is configured to classify an object detected in the AUS by a predetermined object "type". In one embodiment, the classification module 415 determines the "type" of object that has been detected in the AUS 50 and classifies the detected object by the determined type. For example, the classification module 415 is configured to determine whether a detected object is "human", "automobile" or "truck". Once the determination is made, the detected object is classified according to the determined type. The object type may then be incorporated into an event record corresponding to the detected activity/object. Classification module 415 may be configured to characterize the features of a detected object. In one embodiment, the geometric features of a detected object are characterized by a "shape description" of a detected object that is generated based upon the sensor data.

Detection module 416 is configured to detect motion ("activity") by interpreting incoming sensor data received from a sensor device 110. More particularly, the detection module 416 is configured to determine whether the sensor data indicates the presence of "activity" in the AUS 50. Sensor data may be received from different types of sensor units 110 (i.e. video camera, GPS receiver, thermometer, etc.), each of which generate different types of sensor data. The detection module 416 will preferably be configured to accommodate the particular type of sensor data received from the sensor unit 110. Where the sensor unit 110 is configured to include more than one type of sensor, for example, a GPS receiver and an infrared sensitive camera, the detection module 416 will preferably be configured to accommodate both the sensor data from the GPS receiver and the sensor data from the infrared sensitive camera.

In the case of, for example, a sensor device 110 that is configured as a camera, such as a video camera, detected activity will have an "object" that is the subject of the detected activity. In short, activity/motion within the AUS 50 is the result of an object that is moving within the AUS 50. In this case, detection module 416 may be further configured to determine the presence of objects in the AUS 50 based on the sensor data received from the sensor device 110.

Figure 4B:
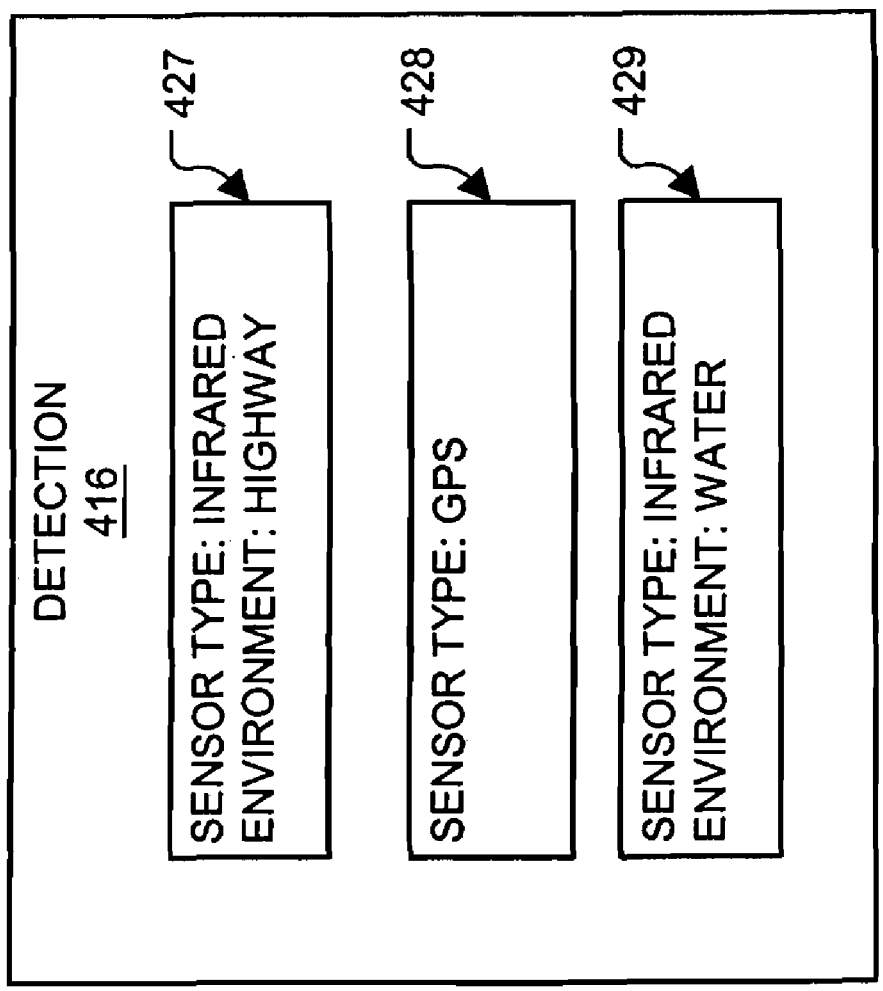
FIG. 4B is a diagram further illustrating an embodiment of detection module 416.

For a given type of sensor device 110, the detection module 416 will preferably be configured to accommodate the sensor data received from the sensor device 110. More particularly, the detection module 416 may be configured to process sensor data so as to take into account, for example, the particular type of environmental factors that the sensor device 110 encounters. For example, in the case of a video camera 301, environmental factors such as, for example, whether the video camera 301 is located indoors or outdoors, or whether the video camera is monitoring motion on a highway or on a body of water or in the air may impact the imagery captured by the video camera, and as a result the sensor data outputted to the sensor unit 210. The detector module 416 may be configured to carry out detection operations so as to accommodate the situation by, for example, offsetting, correcting or otherwise adjusting for any impact that the environmental factors may have on the sensor data. With reference to FIG. 4B an illustration of a further embodiment of the detector module 416 will be described. It can be seen that detector module 416 may be configured to accommodate one or more environmental factors, as well as one or more sensor types. In this example detection module 416 is configured to provide accommodations for infrared sensor data 427 generated by a sensor device that is monitoring a highway. It also provides provisions 428 for a GPS receiver type sensor device 110, as well as an infrared sensor device used to detect activity on a body of water 429.

Detection of the presence of motion based on sensor data that is provided in the form of streaming video can be accomplished in several ways. The detection module 416 may be configured to carry out detection of motion using any one or more of known detection techniques. Examples of known detection techniques that could be used include techniques employing Temporal Differencing, Edge Differencing, Background Subtraction, and/or Statistical Analysis, as described in, for example, "*Image Processing, Analysis, and Machine Vision*", Sonka, Hlavac, Boyle; p 682-685. Other techniques are described in "*Segmentation through the detection changes due to motion*" Jain et al. R Jain, W N Martin, and J K Aggarwa; *Computer Graphics and Image Processing;* 11:13-34, 1979. The disclosures of each of these publications are both hereby incorporated herein by reference.

In a further known detection technique, a reference frame is established and a current frame of video is subtracted from the reference frame. The reference frame may also be established by, for example, averaging multiple frames of video of the "background" of the AUS. The reference frame is compared with a current frame from the sensor data (video stream). The difference between the reference frame and the current frame will constitute potential motion within the AUS. It is possible to use a static reference frame for comparison, however, in a preferred embodiment the reference frame is dynamically updated to incorporate changes in the background/AUS due to, for example, atmospheric phenomena or other environmental conditions. Further, it is possible to carry out detection via other known detection techniques, including, but not limited to a combination of any one or more of the above or other known detection techniques.

Data-formatting module 417 is configured to place data corresponding to a detected activity/object into the form of an event record having a predetermined format. More particularly, in one embodiment, the data-formatting module 417 is configured to generate an event record that corresponds to a predetermined data format, such as, for example, extensible mark-up language (XML) format or hyper-text mark-up language (HTML) format.

Data fusion module 418 is configured to combine multiple types of sensor data received from multiple sensor devices 110. For example, where a visible spectrum video camera and a infrared spectrum camera are provided, the data fusion module 418 is configured to combine the two types of sensor data to provide for greater accuracy for detection and/or classification.

Post-detection filtering module 419 is configured to remove redundant or erroneous event records from being transmitted to a data unit 220.

Recovery module 420 is provided to determine when a sensor device 110 (FIG. 3) has failed. The recovery module 420 is preferably configured to evaluate the sensor data received from a sensor device 110 and determine whether or not the sensor data reflects a failure of the sensor device 110. Where a determination is made that a sensor device has failed, the sensor unit 210 may terminate generation of event records until the sensor device 110 has been repaired or otherwise brought back into proper operation. Further, the sensor unit may be configured to issue an advisory message to the data unit 220, advising of the fact that the sensor device 110 has failed. In turn, the data unit 230 may cause an alarm to be issued or cause some other predetermined action to be taken in response to the advisory message from the sensor unit 210.

One embodiment of the detection process that may be carried out by detection module 416 is further illustrated by the flowchart of FIG. 4C. FIG. 4C illustrates one method of carrying out detection of activity as performed by the detection module 416 of sensor unit 210. With reference to FIG. 4C, it can be seen that sensor data is received (430). A determination is made based on the sensor data as to whether or not there is potential motion within the AUS (431). For example, a small change in the color of an object may be due to environmental factors; such as the movement of the sun or cloud cover. While changes in color within the AUS may correspond to actual motion within the AUS, where the change in value (color value) is small (or below a predetermined threshold) such changes will not be viewed as constituting an object. On the other hand, where the change in value is above a predetermined threshold, such changes will be viewed as constituting motion. For example, when a car is moving along a roadway within the AUS, the color value of the roadway over which the car is positioned typically changes significantly as the car moves over top of the roadway. This change in color value will generally be large (or above a predetermined threshold). As a result, this large change in value will be viewed as constituting an object.

Where there are split objects present in the AUS, the process may be further continued by carrying out operations to recombine split objects (433). Split objects may occur, for example, where more than one object appears within a particular line of view of, for example, a video camera. In such a case, it is possible for a first object located at a point within the AUS to be located along the same line of view as a second object that is located in the AUS but further from the video camera. As an example, consider a camera that is positioned to monitor a roadway that has a sidewalk that runs parallel to the roadway, and is located between the roadway and the camera. In this case a person walking down the sidewalk while a car is moving along the roadway could block the view of the middle portion of the car and give the appearance that the car is actually two objects (i.e. a split object). In this case, efforts must be made to recombine the split object for evaluation (435). Split objects may also result from such things as incorrect positioning or adjustment of control setting (parameters) of a sensor device 110. Split objects may also result from environmental factors, such as, for example, fog within the AUS or near the sensor device 110. Additionally, technical limitations of the sensor device may also cause the occurrence of split objects.

Filtering (434) may then be carried out to eliminate detected objects that are above or below a predetermined size. If the potential object is too small or too large, it will not be viewed as an object. Otherwise, a determination is made that activity has been detected (436).

Figure 4D:
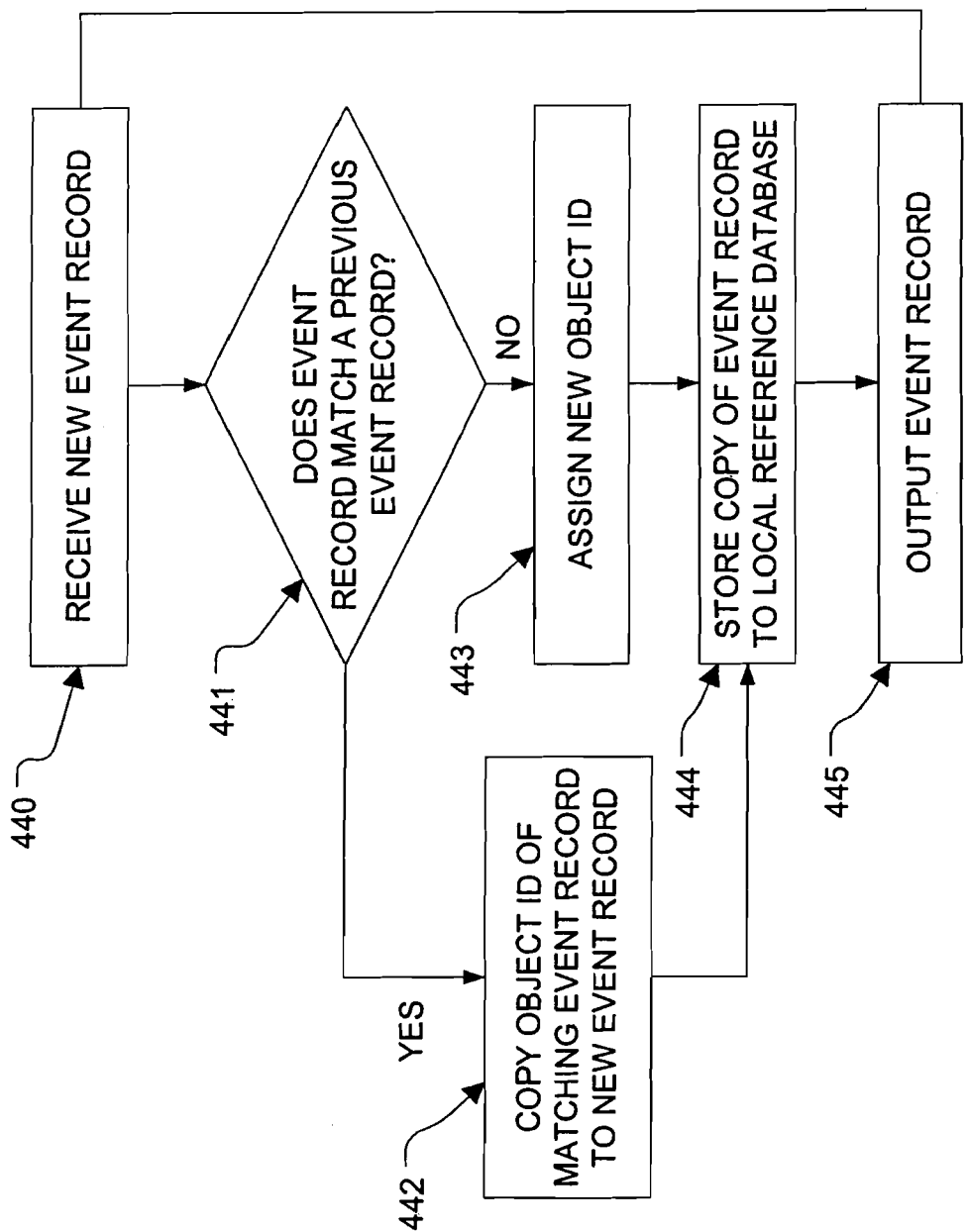
FIG. 4D is a flowchart illustrating a process of tracking a detected object that is carried out by one embodiment of the sensor unit 210.

FIG. 4D shows a flow chart that illustrates one method of carrying out tracking as performed by the tracking module 411 of sensor unit 210. In this example, a new event record is generated (440). A determination is made as to whether or not the new event record corresponds to a previous event record (441). In a preferred embodiment, the sensor unit 220 is configured to cache a limited number of event records into a local database as historical information for comparison with a new (current) event record. If the current event record does correspond to a previous event record, the unique identifier (object ID) corresponding to the previous event record is assigned to the new event record (442). If there is no correspondence, a new unique identifier (object ID) is generated and assigned to the current event record (443). A copy of the new event record may then be stored to the local database (444) and the new event record is outputted (445). The new event record is associated with other event records corresponding to a particular object based upon the unique ID (object ID). Reference to all event records corresponding to a particular object ID, depicts a path or "track" which illustrates the route of travel of the particular object within the AUS, for the given period of time.

Figure 4E:
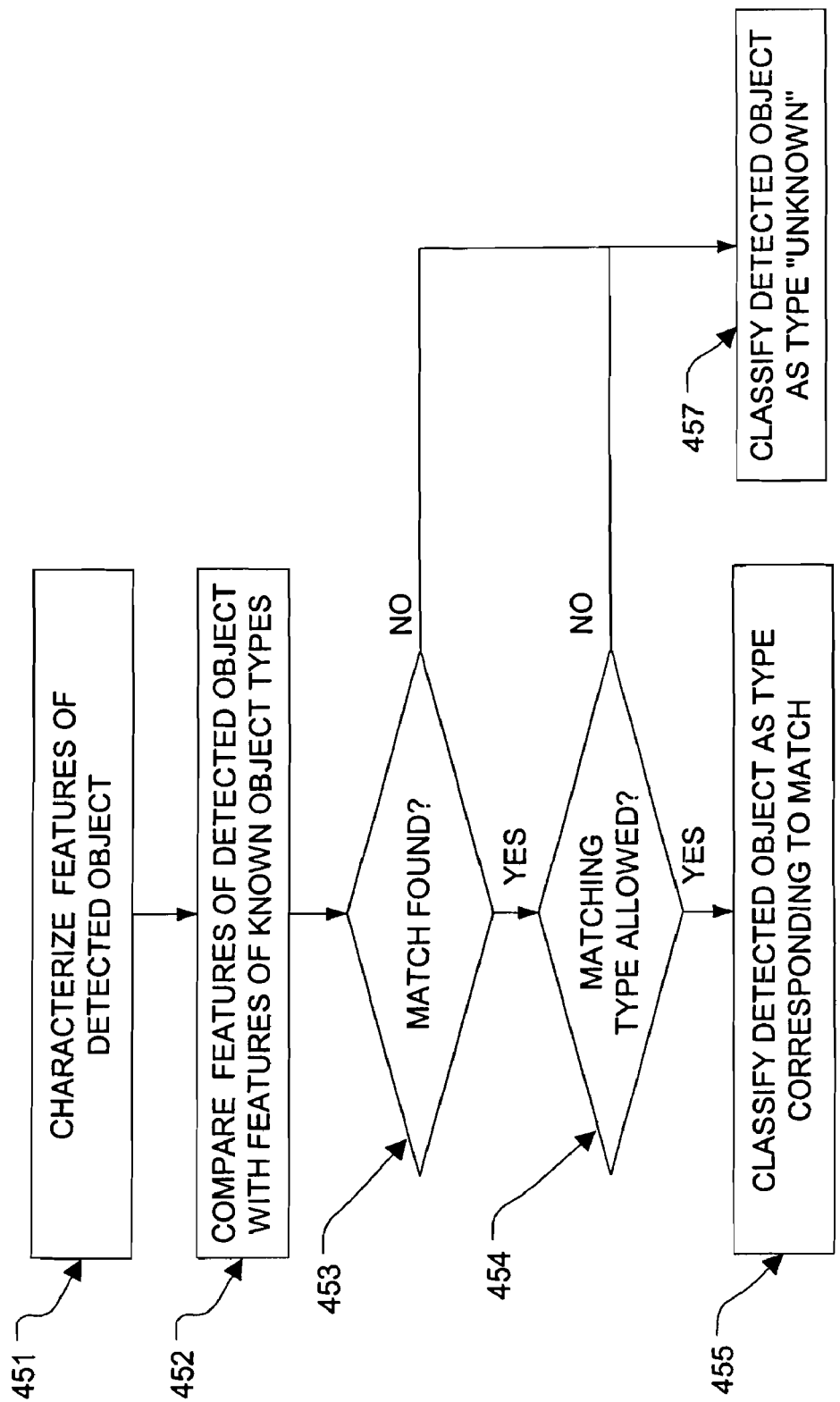
FIG. 4E is a flowchart illustrating a process of classifying a detected object carried out by one embodiment of the sensor unit 210.

FIG. 4E illustrates one method of carrying out classification of detected objects as performed by the classification module 415 of sensor unit 210. With reference to FIG. 4E, it can be seen that the features of a detected object are characterized (451). In one embodiment, such features may be characterized by, for example, calculating the geometric features of the detected object. Geometric features may include, for example, the form factor, rectangular measure and/or convexity of the detected object's outline. These features may then be compared with features of known objects (452). In one embodiment, a database of geometric features (feature database) of known objects is maintained. The features of the detected object may be compared with the features of the known objects in the feature database (453). If there is no match of features, the detected object will be classified as "unknown" (457). If there is a match between the features of the detected object and the features of a known object type described in the features database, a determination is then made as to whether or not the matching known object type is "allowed" (454). This determination may be made, for example, by comparing the location of the detected object within the AUS, with information that relates the character of the various areas (segments) of the AUS with object types that are allowed to exist in the various areas. This information may be set out in a segmentation map corresponding to the AUS. In one embodiment, the segmentation map is configured to describe, for example, whether the various areas of the AUS are "LAND", "SKY" and/or "BODY OF WATER". For each area, a list of permissible/allowed object types may be set out.

As an example, if the features of the detected object match the features of, for example, an "AUTOMOBILE" object type, a determination is made as to whether or not an AUTOMOBILE object type is allowable in the area at which the detected object is located. It is typical that automobiles do not operate/function on bodies of water. Thus, in this case, where the area in which the detected object is characterized as a "body of water", it may be determined that an AUTOMOBILE is not allowed to exist in an area characterized as a body of water, thus making the matching object type a "non-allowed" object type. However, if the detected object matches the features of, for example, a "BOAT" object type, it will preferably be determined that a BOAT object type is allowed to exist in an area characterized as a body of water, thus making the matching object type an allowed object type. If the matching object type is determined to be non-allowed, the detected object will be classified as "unknown" (457). Otherwise, if the matching object type is allowable, the detected object will be classified according to the type of the matching object type (455). One example of characterizing the geometric features of a detected object has been described and discussed in "*Efficiency of Simple Shape Descriptors*", M. Peura, J. Hvarinen, Helsinki, *ADVANCES IN VISUAL FORM ANALYSIS: Proceedings of the Third International Workshop on Visual Form*, Capri Italy, May 28-30, 1997 (pages 443-451) the disclosure of which is incorporated herein by reference.

Figure 4F:
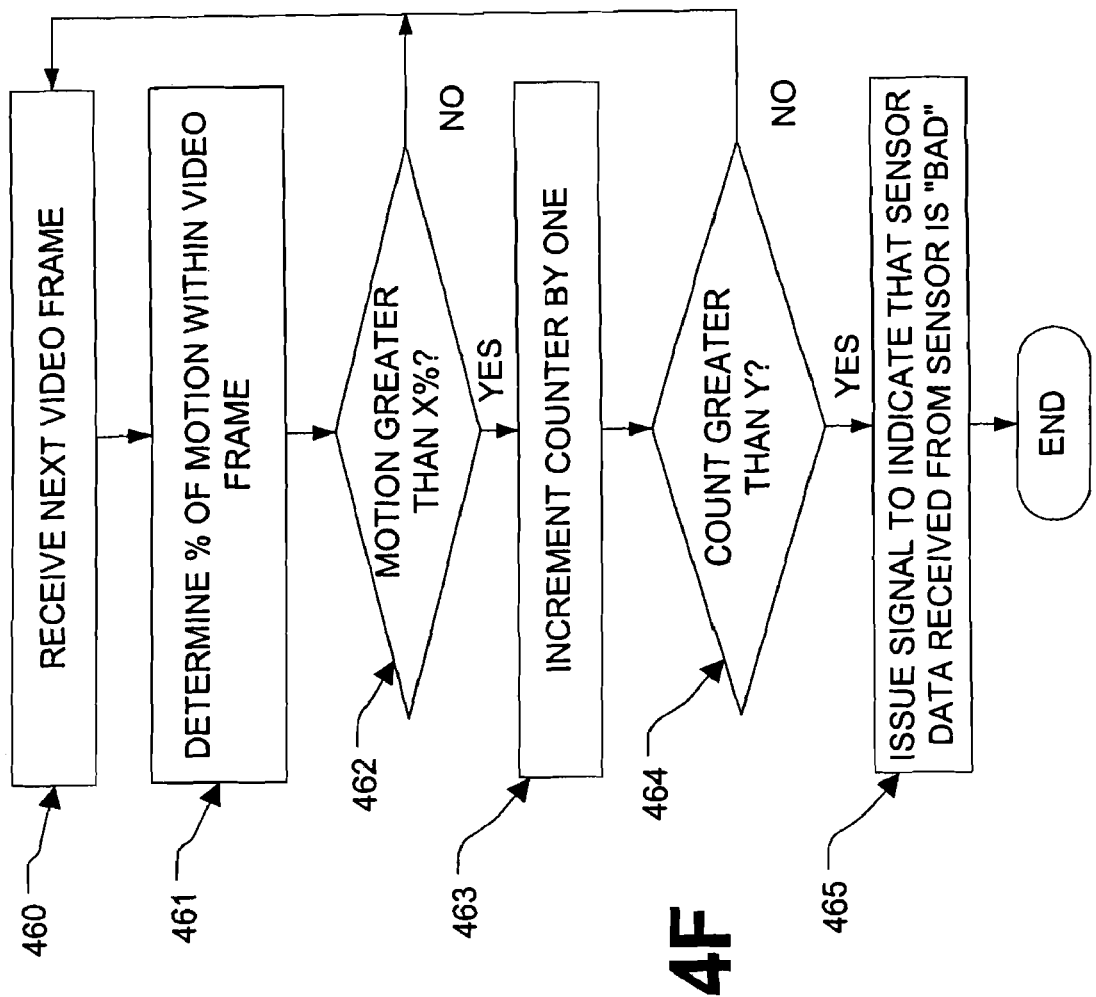
FIG. 4F is a flowchart illustrating a process of recovery carried out by one embodiment of the sensor unit 210.

FIG. 4F shows a flowchart illustrating one method of carrying out recovery of a sensor device as performed by the recovery module 420 of sensor unit 210. In this example, the sensor device 110 is configured as a video camera. It can be seen that a frame of video is received (460); a determination is made of the level of motion as depicted by the frame of video (461); if the motion exceeds a predetermined level (462); a counter is incremented by one (463); a determination is made as to whether or not the value of the counter exceeds a predetermined value (464), if so, a signal is issued to indicate that the sensor data received from the sensor device 110 is corrupt or otherwise not reliable (465). If the counter value does not exceed a predetermined value, the next video frame is received and the process begins again.

With reference to FIG. 4G, the operation of the sensor unit 210 (FIG. 3) according to one embodiment will be described. Sensor data from a sensor device 110 is received by the sensor unit 210 (420). A determination is made as to whether or not the received sensor data indicates activity (421). If so, the subject of the activity is classified (422). An event record is then generated (423) that reflects the detected activity, including the identity of the subject, the time of the activity and the location of the activity. Other information may also be incorporated in the event record as may be desired and/or available from the sensor unit 210. If desired, the event record may be placed into a predetermined format (424) and/or encrypted (425). The event record may then be outputted (426) for transmission to a data unit 220 (FIG. 3).

FIG. 5A shows an illustration depicting an example of an event record 510 that may be generated by a sensor unit 210 (FIG. 3) in response to sensor data received from a sensor device 110 (FIG. 3) and that is determined by the detection module 311 to constitute "activity". In a preferred embodiment, the event record 510 will include data (parameters) relating to the detected activity, such as an identifier of the area/portion of the AUS in which the activity is detected (541); an identifier of the sensor device detecting the activity (542); a timestamp showing the time at which surveillance data is retrieved from the sensor device (543); object status (544); azimuth of the sensor device (545); tilt of the sensor device (546); identification of the object that is the subject of activity (547); the type of object (548); the X, Y and Z coordinates of a detected object (549-551); width of the object (552); height of the object (553); direction vector information of the detected object (554) and/or the speed of the object (555). It will be recognized that any one or more of the above listed parameters may be included in the event record. Further, other parameters that are not listed above may be included as may be desired or otherwise necessary. Additionally, in the case of video sensor 301 (FIG. 3), the event record may include information to, for example, indicate that video imagery of the detected activity is available (556) for viewing. This video imagery may be provided in real time or retrieved from memory where it may be stored.

FIG. 5B illustrates one embodiment of the schema of the event record 510 generated and transmitted to the data unit 210. In this example, an event record 510 formatted in XML is provided. This example shows an event record schema that incorporates most of the parameters described and discussed with respect to FIG. 5A.

The location of a detected activity may correspond to the location of the sensor device 110 (FIG. 3) that senses the activity. The sensor unit 210 (FIG. 3) may be configured to store location data for each identified sensor device 110. Such location data may be stored in memory associated with the sensor unit 210. Thus, when the particular sensor detects activity, the sensor unit 210 may be configured to incorporate the stored location data in the event record that is generated in response to the detected activity.

Alternatively, sensor device 110 may be configured to provide location data to the sensor device 110 as a part of the sensor data provided to the sensor unit 210. This location data may be generated, for example, based upon information from a GPS receiver associated with the sensor device 110 or merely read out from memory associated with the sensor device 110. As a further example, in the case of a sensor device 110 configured as a video camera 301 (FIG. 3), the sensor unit 210 may be configured to determine the orientation of the activity within the AUS, based upon the sensor data it receives from the sensor device (video camera 301). In this embodiment, the video camera 301 would be used alone or in conjunction with other sensor devices to determine the location within the AUS of the detected activity. The sensor unit 210 may be configured to incorporate such location data into the event record 350 (FIG. 5A).

The format of the time information provided by the event record 510 may be any time format, including 12-hour or 24-hour clock format. The location may be specified in any coordinate format, including degrees/minutes/seconds (DMS), Degree Decimal Minutes (DDM) or Universal Transverse Mercator (UTM). Location may also be specified by other means, such as denoting the room, building number or address of the activity. The format of any information provided by the event record 510 will preferably be the same as the format in which information is stored/used by the surveillance database 322 (FIG. 3).

With further reference to FIG. 3, the processing section 311 may be configured to output a signal (compressed video) representative of the video received from the sensor 301. Both the event record 510 (FIG. 5A) and the compressed video may be outputted for transmission to a data unit 220. The compressed video may also be stored in memory if desired for subsequent retrieval/viewing. In one embodiment, the data unit 220 is configured to store the compressed video to memory and/or distribute it to end users.

In a further embodiment, the processing section 311 is configured to generate an event record 510 in extensible mark-up language (XML) format. It may also be further configured to encrypt the event record 510 in accordance with a predetermined encryption scheme. The XML format event record may be transmitted to data unit 220 via a network 114 that is configured as a secured network capable of providing data encryption via communications protocols such as, for example, secure sockets layers (SSL). Alternatively, the event record 510 may be encrypted via processing carried out by processing section 311. Such encryption may be carried out in accordance with predetermined encryption schemes prior to transmitting the event record 510 to the data unit 220.

The control section 312 of sensor unit 210 (FIG. 3) may be configured to provide control signals to a sensor unit 110. In the example shown in FIG. 3, the sensor unit 210 is configured to provide a control signal to the gimbal 302 and the video camera 301 of sensor device 110. These control signals can be used, for example, to cause the orientation of the gimbal 302 to be adjusted/moved in a desired direction and thereby adjust/re-orientate the video camera 301 that is providing sensor data to the sensor unit 210. The control signals may also adjust such things as the contrast, white balance, aperture and color mode of the video camera 301. Control signals may be automatically generated by the sensor unit 210 based upon predetermined criteria. Alternatively, the controls signals may be generated by the sensor unit 210 based upon commands received by the sensor unit 210 from a data unit 220.

Figure 6:
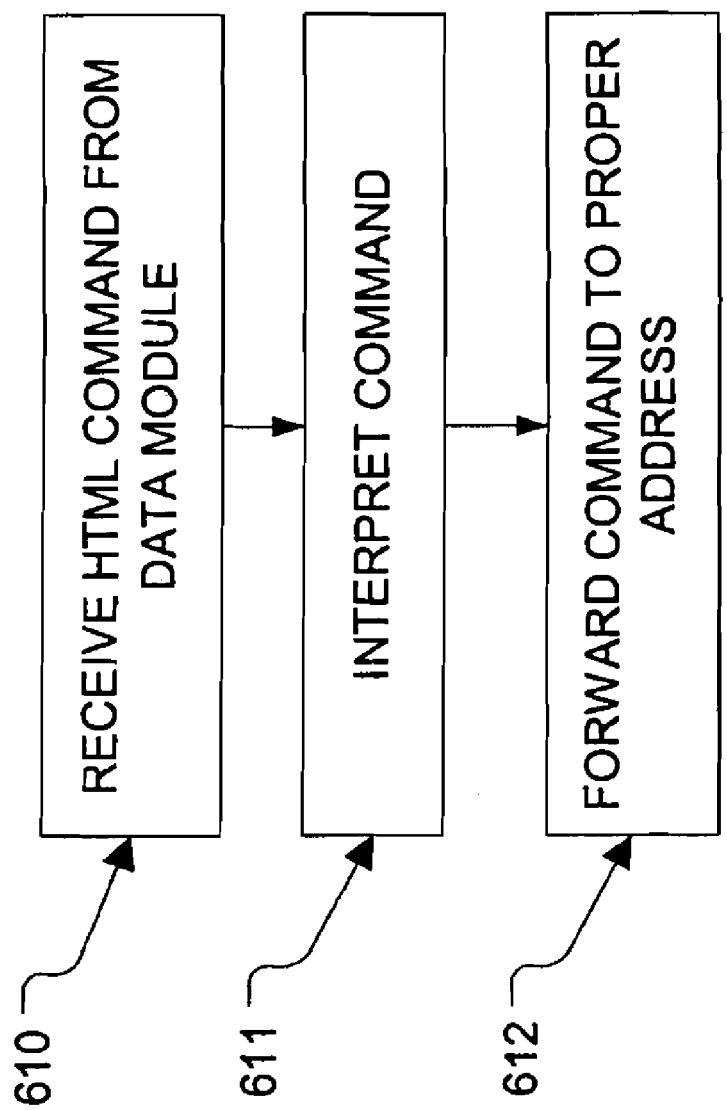
FIG. 6 is a flowchart illustrating a process of issuing a command that is carried out by one embodiment of the sensor unit 210.

In one embodiment, the control section 312 of sensor unit 210 is configured to provide control signals to either the hardware and/or software of the sensor unit 210 and/or the sensor device 110. In a preferred embodiment, the control section 312 is configured as a web server capable of handling/distributing content in various formats, including, but not limited to, HTML and XML formats. Further, the control section 312 may be configured to translate commands received from the data unit 220, into control signals that are recognized by the sensor device 110. In an alternative embodiment, the control section 312 receives a request from the data unit 220 and issues a command to carry out the request. This process is generally illustrated by the flowchart of FIG. 6. With reference to FIG. 6, a request is received from the data unit 220 (610). The sensor unit 210 interprets and/or forwards the command (611) to an address associated with the hardware/software relevant to carrying out the request (612).

The sensor unit 210 can be implemented in hardware, software, firmware, or a combination thereof. In one embodiment, sensor unit 210 is configured to include a sensor device 110. In the preferred embodiment(s), the sensor unit 210 is implemented in software or firmware that is stored in a memory and that is executed by a suitable instruction execution system. If implemented in hardware, as in an alternative embodiment, the sensor system 210 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

Figure 7:
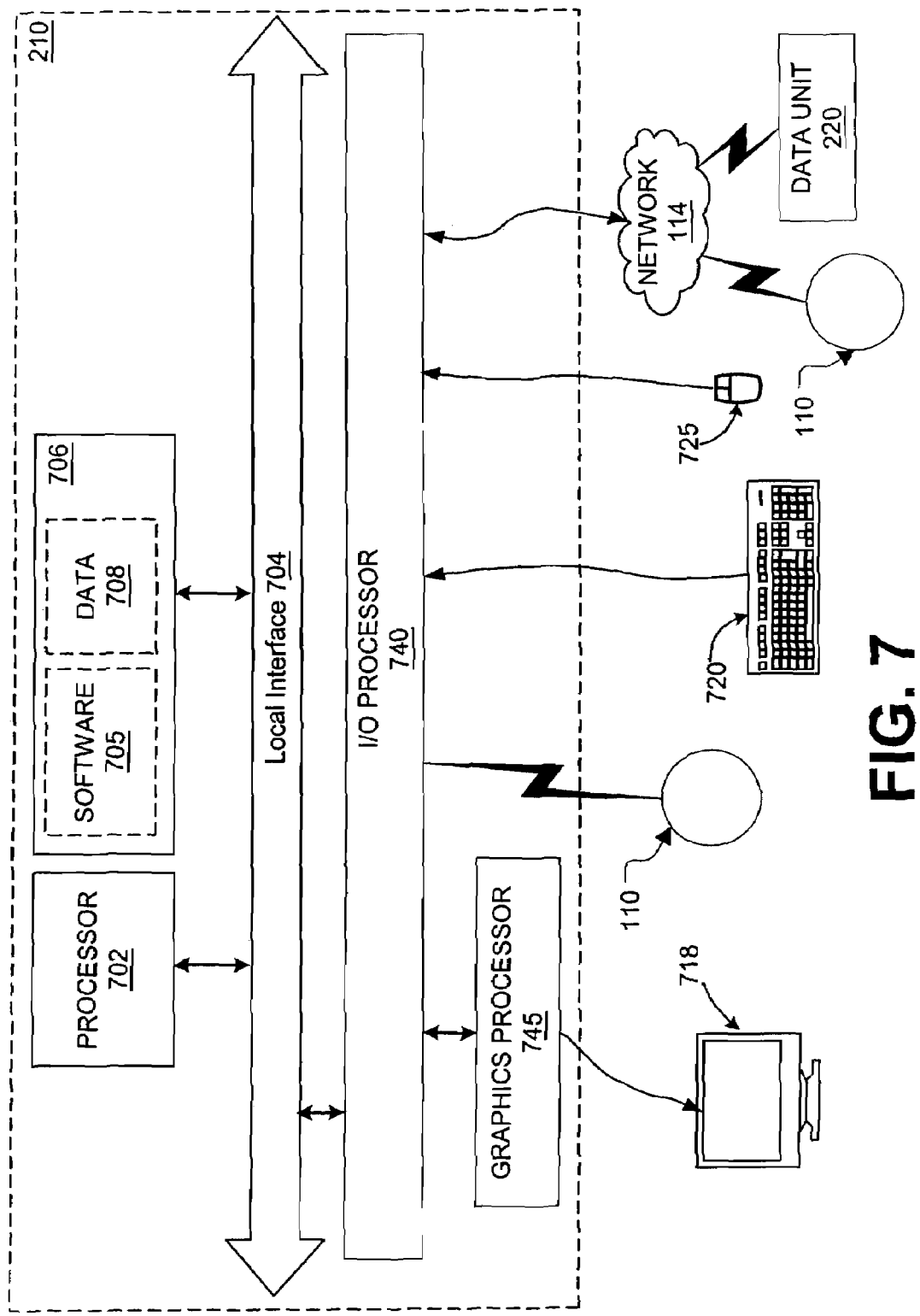
FIG. 7 is a block diagram illustrating one embodiment of the sensor unit 210.

FIG. 7 illustrates an embodiment of a sensor unit 210. In this embodiment, sensor unit 210 includes a processor 702, a local interface bus 704, storage memory 706 for storing electronic format instructions (software) 705 and data 708. Storage memory 706 may include both volatile and non-volatile memory. An input/output interface 740 may be provided for interfacing with and communicating data received from/to, for example, a network 775 or input devices such as a keyboard 720 or pointing device 725. Input/output interface 740 may also be configured to interface with, for example, graphics processor 745. Graphics processor 745 may be provided for carrying out the processing of graphic information for display in accordance with instructions from processor 702.

Processor 702 accesses data stored in memory 706 in accordance with, for example, software 705 stored on memory 706. Data stored in memory 706 may include video received from the sensor device 110.

Processor 702 may be configured to receive sensor data from a sensor device 110 and generate an event record based upon the sensor data. A database of known features of known objects may be stored as data 708 in memory 706, in accordance with software 705. Further, reference data representing a "background frame" may also be stored as data 708 in memory 706. Processor 702 may also be configured to place the event record into a predetermined format, such as, for example, extensible mark-up language format, in accordance with software 705 stored in memory 706. Processor 702 may be further configured to encrypt the event record 510 (FIG. 5A) in accordance with software 705 stored in memory 716. The software 705 may include, for example, one or more applications, configured to detect activity, cause an event record to be generated and/or formatted and/or encrypted according to the methodology described by the flowcharts of FIGS. 4C, 4D, 4E and 4G. The processor 702 may be configured to carry out the functions of any one, or all, of the processing section 311 and/or the control section 312.

The flow charts of FIGS. 4C, 4D, 4E and 4G show the architecture, functionality, and operation of possible implementations of the software 705 (FIG. 7). In this regard, each block represents a module, segment, or portion of code, which comprises one or more executable instructions for implementing the specified logical function(s). It should also be noted that in some alternative implementations, the functions noted in the blocks may occur out of the order noted in FIGS. 4C, 4D, 4E and 4G. For example, two blocks shown in succession in FIGS. 4C, 4D, 4E and/or 4G may in fact be executed substantially concurrently or the blocks may sometimes be executed in the reverse order, depending upon the functionality involved.

Data Unit

With further reference to FIG. 3, the data unit 220 includes a communications module 320, a processing module 321 and a surveillance database 322. The data unit 220 is configured to access a geometric model representative of an AUS 50. This geometric model may be referred to as the "surveillance model". In a preferred embodiment, the surveillance model is a geographic information systems (GIS) format map/illustration depicting pre-existing or known attributes of the AUS 50. The data unit 220 is preferably configured to either publish the surveillance model to a predetermined address for access by end users, or alternatively, to cause the surveillance model to be displayed on an associated display device.

Figure 8A:
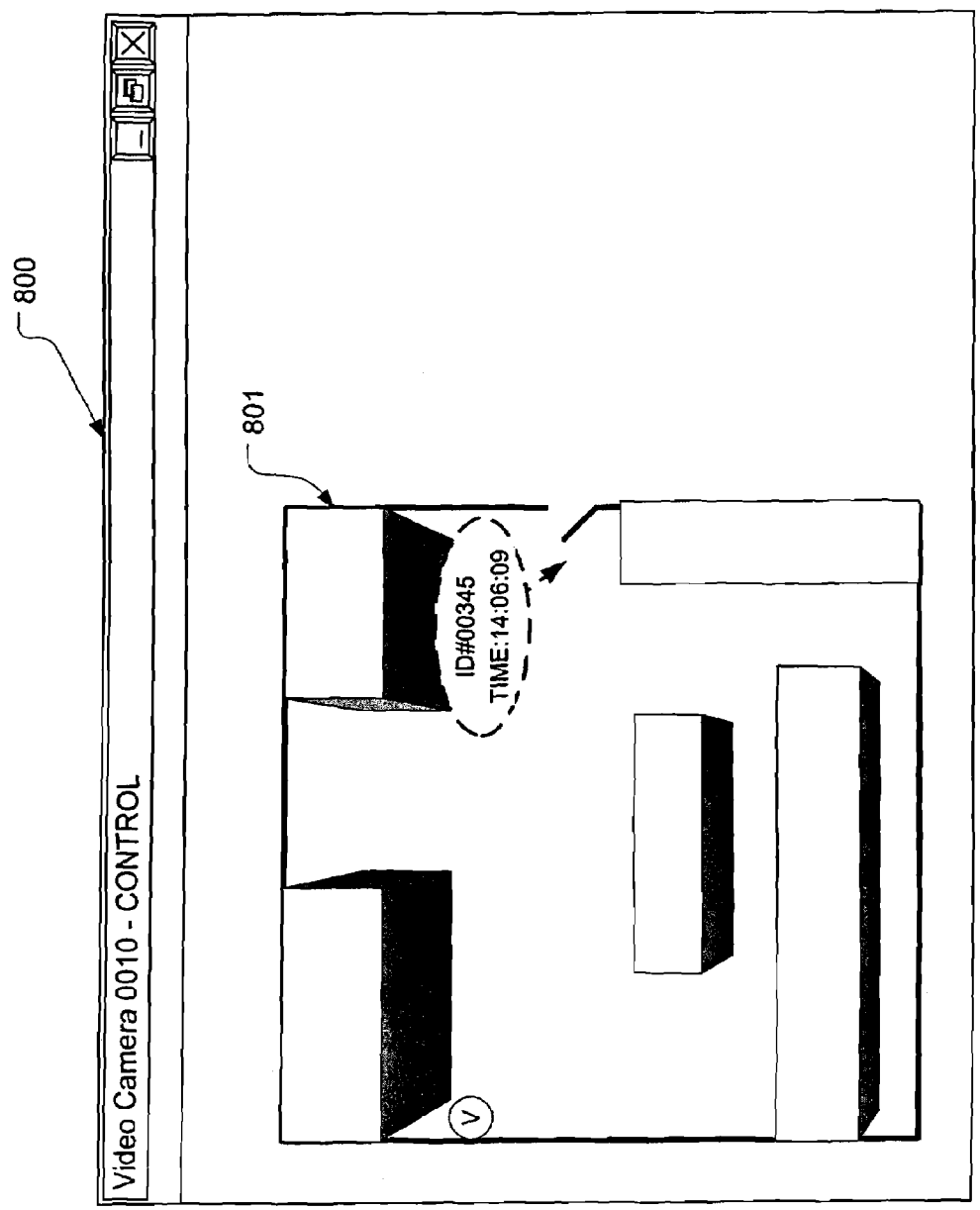
FIG. 8A is a diagram illustrating a surveillance model 801 displayed for viewing by an end user.

FIG. 8A shows an example of a surveillance model 801 representative of an AUS that is displayed in a display 800 on an associated display device. It will be recognized that the surveillance model 801, may also be representative of a surveillance model 801 that is published to a predetermined web address for access by an end user, using, for example, a computer configured to run an appropriate web browser, or a control module 230 (FIG. 3).

With further reference to FIG. 3, the data unit 220 may be configured to incorporate the data contained in an event record 510 (FIG. 5A) into the surveillance model by, for example, publishing the surveillance model with an overlaid "activity icon" representative of detected activity. The activity icon acts as an indicator/representation of the activity represented by the event record. The data in the event record is also preferably incorporated into a surveillance database 322. The data unit 220 may also be configured to include one or more storage devices (storage memory) for storing surveillance database 322. The data unit 220 may also be configured to receive event record 350 from sensor unit 210 and to process the data contained therein, as may be required.

In one embodiment, the video camera 301 is configured to receive control signals for adjusting such video camera attributes as white balance, contrast, gain, brightness, aperture size and/or whether or not the output is in color (RGB) or monochrome.

The communication module 320 acts as an interface for handling the exchange of data and/or commands from, to and between the sensor unit 210 and the control module 230. In one embodiment, the communication module 320 is configured as an HTML and/or XML compliant web server. Processing module 321 is configured to carry out predetermined processing of surveillance data to accomplish such things as, for example, data statistical analysis, detected object filtering and/or generating an alarm when activity is detected within a predefined area. Processing may also include tasks such as calculating speed and/or acceleration of a detected object. The processing module 321 may be configured to automatically carry out certain data processing tasks based upon predetermined criteria. It may also be configured to carry out data processing activities in accordance with commands received from control unit 230 (FIG. 3).

Figure 8B:
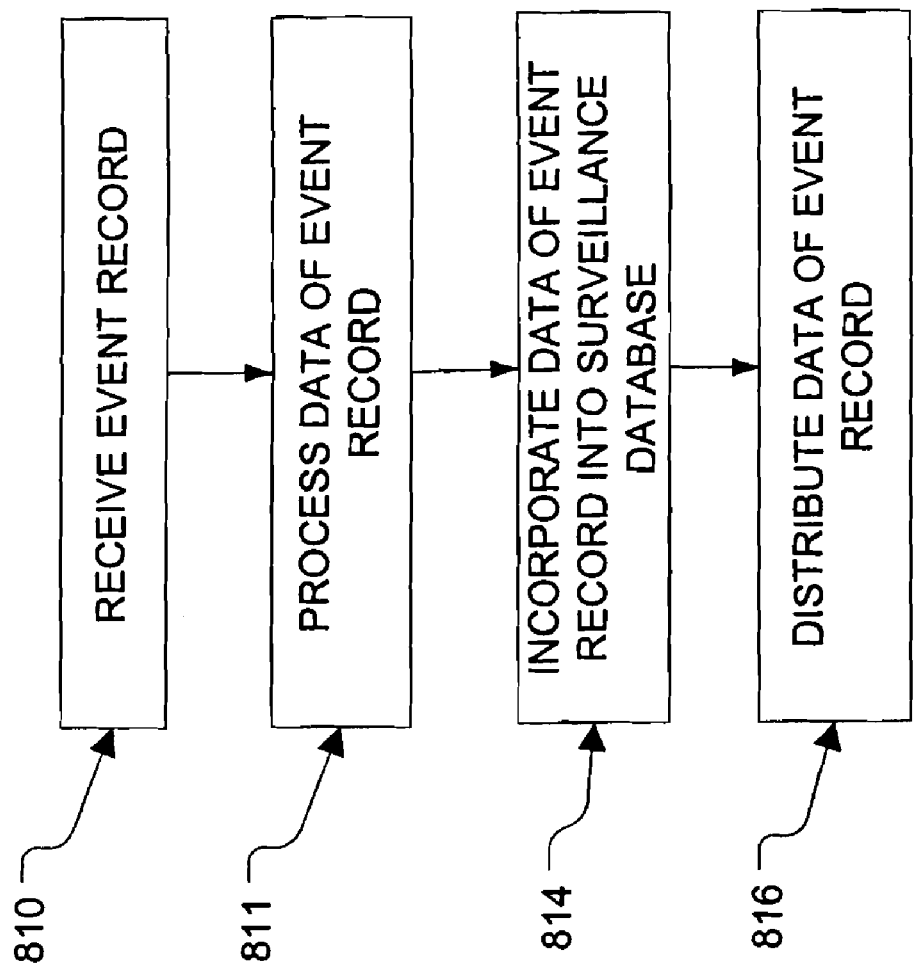
FIG. 8B is a flowchart illustrating a process carried out by one embodiment of the data unit 220.

FIG. 8B shows a flowchart illustrating the operation of one embodiment of data unit 220 (FIG. 3). In this embodiment, an event record 510 (FIG. 5A) is received by the data unit 220 from a sensor unit 210 (810). The data contained in the event record will be processed by the data unit 220 as may be necessary (812). The event record data may then be incorporated into a surveillance database (814). The event record data may also be distributed via publication to a predetermined address (816).

In one embodiment, the event record data is represented as an activity icon that is displayed in conjunction with a predetermined surveillance model. In a preferred embodiment, the activity icon is displayed as an overlay on the surveillance model. The activity icon may consist of, for example, either graphic and/or textual information representative of detected activity. An activity icon may be overlaid on a surveillance model and viewable in conjunction with the surveillance model for a predetermined period of time, after which it ceases to be displayed. Alternatively, the activity icon may remain overlaid on the surveillance model and viewable until some predetermined event/occurrence has taken place.

FIG. 8C shows a flowchart illustrating a process carried out by the data unit 220. A command is received from the control module 230 (820). A determination is made as to whether or not the command is intended to be directed to the sensor unit 210 (821). If so, the command is forwarded to the sensor unit 210 where it is translated and issued as described above. Otherwise, a determination is made as to whether or not the received command is a request for the generation of a report (822). If so, a report is generated based upon the contents of the surveillance database 322 (825). If visualization is requested (823), such as, for example, display of a graphic representation of the surveillance model, streaming video or statistical data, an appropriate visualization will be generated and/or outputted for display on a display device (826).

Figure 8D:
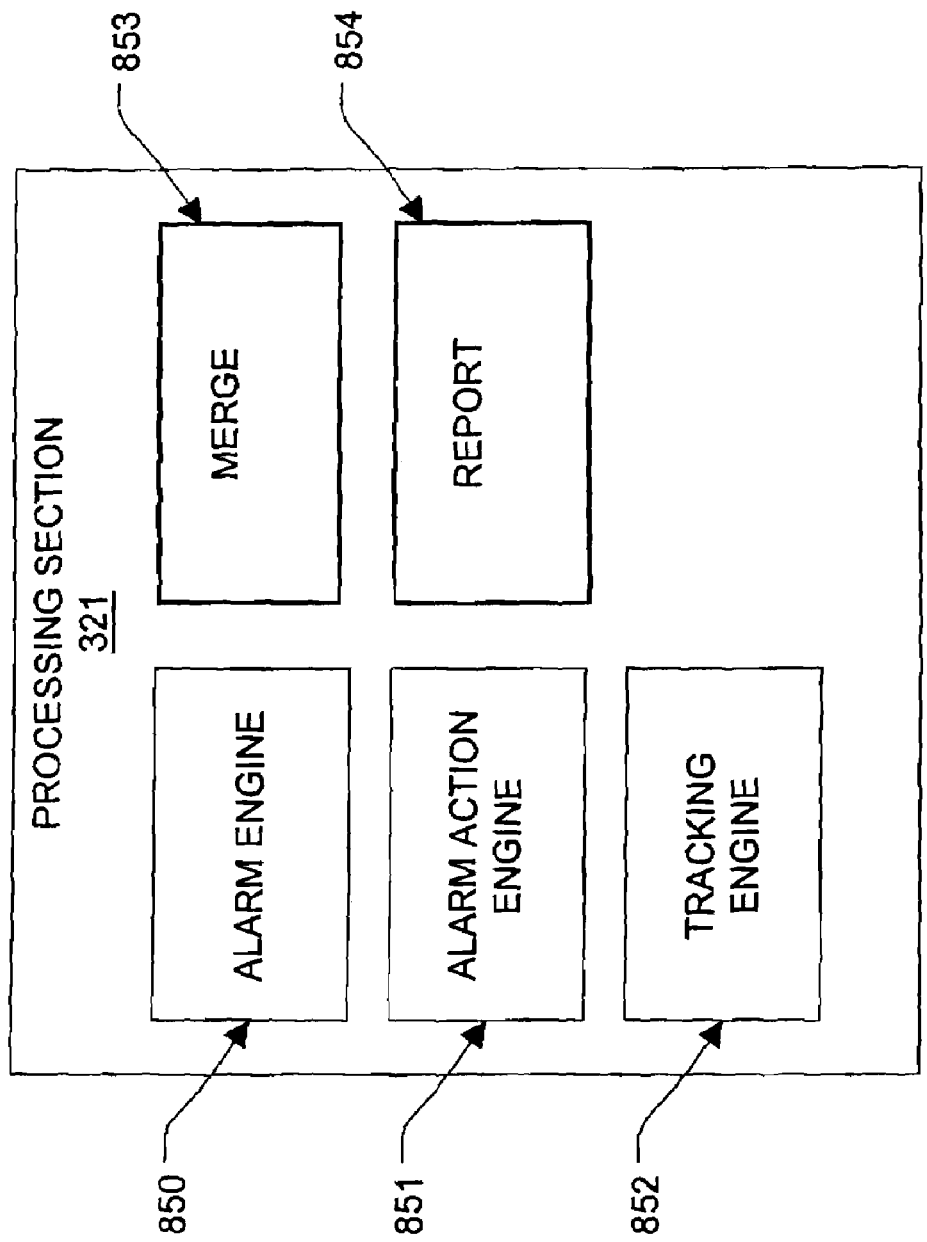
FIG. 8D is a diagram illustrating processing section 321 of data unit 220.

FIG. 8D shows a further illustration of processing module 321 (FIG. 3). The processing module 321 may be configured to include an alarm engine 850, alarm action engine 851, tracking engine 853, report module 852 and merge module 854.

The alarm engine 850 is preferably configured to analyze event records received from a sensor unit 210 and, more particularly, to analyze each event record to determine whether or not certain predetermined alarm criteria has been met. If the event record contains information that indicates that alarm criteria has been met, the alarm engine 850 will generate an alarm record. The alarm record will specify an event record that has met the alarm criteria.

Alarm criteria may specify, for example, that if an event record indicates activity at a particular location, an alarm criteria has been met. Other criteria may also be established as may be desired or necessary for a given situation or purpose.

The alarm record may be generated to indicate that the activity is, for example, a low priority alarm or a high priority alarm, depending on the nature of the activity described by the event record. Other alarm indicators may also be used, as may be desired. Further, any number of alarm classifications is possible.

The processing module 321 will also preferably include an alarm action engine 851. The alarm action engine 851 is preferably configured to receive an alarm generated by the alarm engine 850. In turn, the alarm action engine 851 will access the event record that is identified by the alarm and determine what action is required. This determination is based upon predetermined action criteria that sets out certain actions to be taken for certain event record information.

As an example, the alarm action engine 851 may receive a high priority alarm from the alarm engine 850. Upon accessing the event record that triggered the alarm, it is determined that movement of an unknown object has been detected to a particular location.

The alarm action engine 851 may be configured to give attention to the high priority alarm before attending to any non-high priority alarms. In this case, the alarm action engine 851 may be configured to cause, for example, a predetermined telephone number to be dialed and a prerecorded message to be played when the number is answered. The predetermined telephone number may, for example, reach a party responsible for the location in which the activity was detected. The pre-recorded message may, for example, tell the answering party that activity has been detected in their area of responsibility.

Alternatively, the alarm action engine 851 may be configured to send an e-mail message to a predetermined e-mail address. The e-mail address may be, for example, an e-mail address that is monitored by a party that is responsible for the area in which the activity was detected. The e-mail message may contain a pre-composed message to alert the responsible party of the detected activity. The e-mail message may also be generated to contain an active link to, for example, the properties page for the sensor device that detected the activity. Where the sensor device 110 (FIG. 3) is, for example, a video camera 301 (FIG. 3), the party receiving the e-mail message could call up the properties page of the sensor device and, for example, directly view streaming video from the sensor device that captured the activity.

The data unit 220 may also be configured to include a track engine 852. Based upon all/selected event records received by the data unit 220, the track engine 852 determines the path that an object has taken within the AUS 50. The track engine 852 is configured to generate a visual representation of the path of a particular object, by reviewing event record data to determine the location of the object within the AUS over a given period of time. The track engine 852 uses the object ID of the object to find all event records received/generated during the given period of time that contain the same object ID. A visual representation of the path may then be created showing the location of the object for the period of time. This visual representation is preferably displayed as an activity icon, or series of activity icons, in conjunction with the surveillance model.

A merge module 853 is provided for merging event record data created by various sensor devices that corresponds to a particular object detected within the AUS 50. It may be said that the merge module 853 is configured to merge "tracks" for a particular detected object that are represented by event records in the surveillance database 322. By merging the tracks for a particular detected object, the path of travel of the detected object for a predetermined period of time may be determined or otherwise described.

Figure 8E:
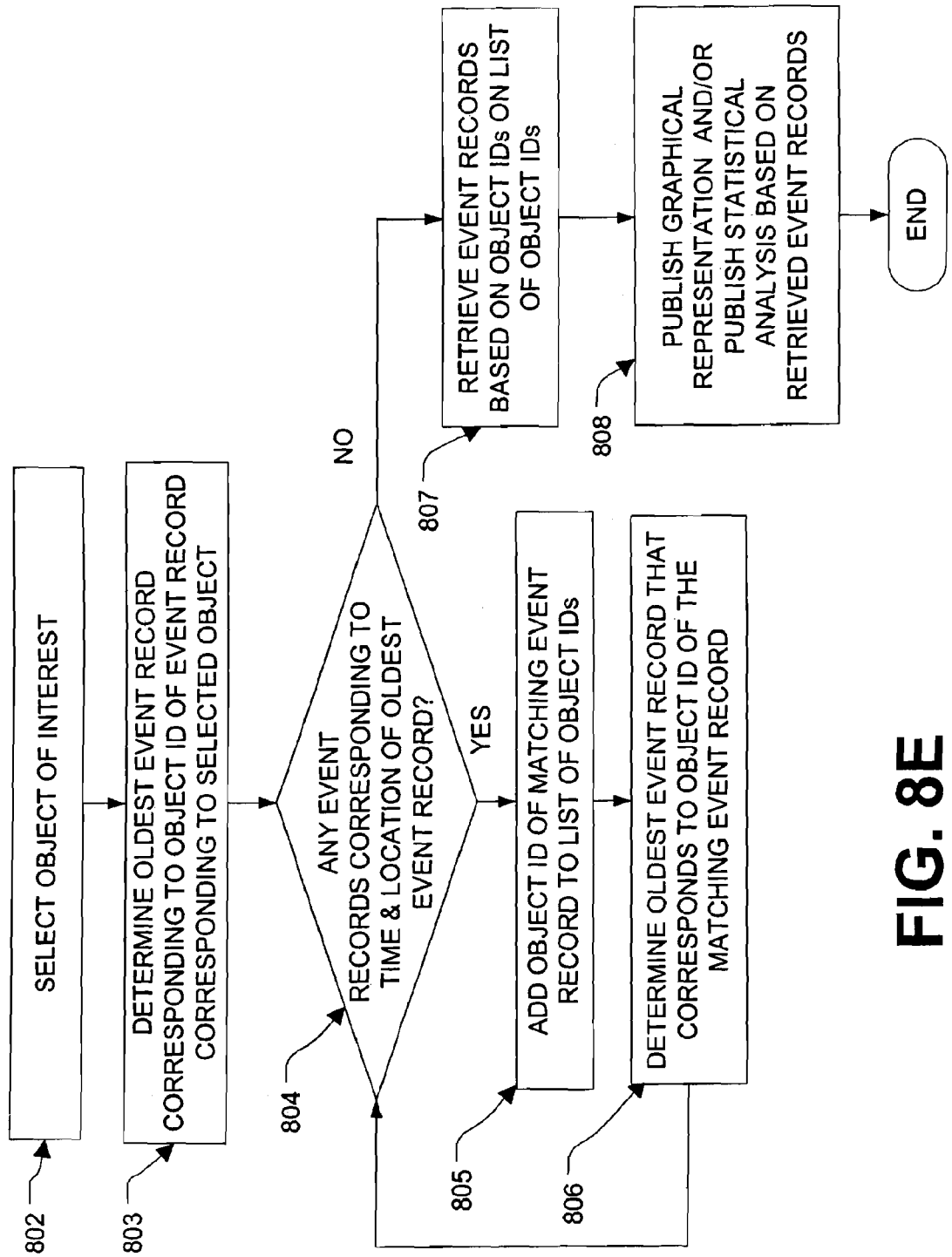
FIG. 8E is a flowchart illustrating a process of merging track data that is carried out by one embodiment of the data unit 220.

In one embodiment, the merge module 853 is configured to carry out the process of merging track data in accordance with the process set out in the flowchart of FIG. 8E. With reference to FIG. 8E it will be noted that a detected object of interest is selected, or otherwise identified (802). The oldest event record in the surveillance database that corresponds to the "object ID" of the selected object of interest is determined (803). A determination is then made as to whether or not any event record in the surveillance database corresponds to the event record determined to be the oldest corresponding event record (804). In a preferred embodiment, this determination is made by comparing the time and location of the event records. If so, the object ID of the corresponding event record is added to a track list (805). The oldest event record that corresponds to the object ID of the matching event record is then determined (806). Subsequently, step 803 is repeated based on the oldest event record determined in step 806.

If no event records corresponding to the time and location of the oldest event record are determined at step 804, then event records may be retrieved based on the object IDs listed on the object ID list (807). A graphical representation of a track corresponding to a particular object may then be published or displayed based upon the retrieved event records (808).

The data unit 220 of the present invention can be implemented in hardware, software, firmware, or a combination thereof. In the preferred embodiment(s), the data unit 220 is implemented in software or firmware that is stored in a memory and that is executed by a suitable instruction execution system. If implemented in hardware, as in an alternative embodiment, the data system 220 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

Figure 8F:
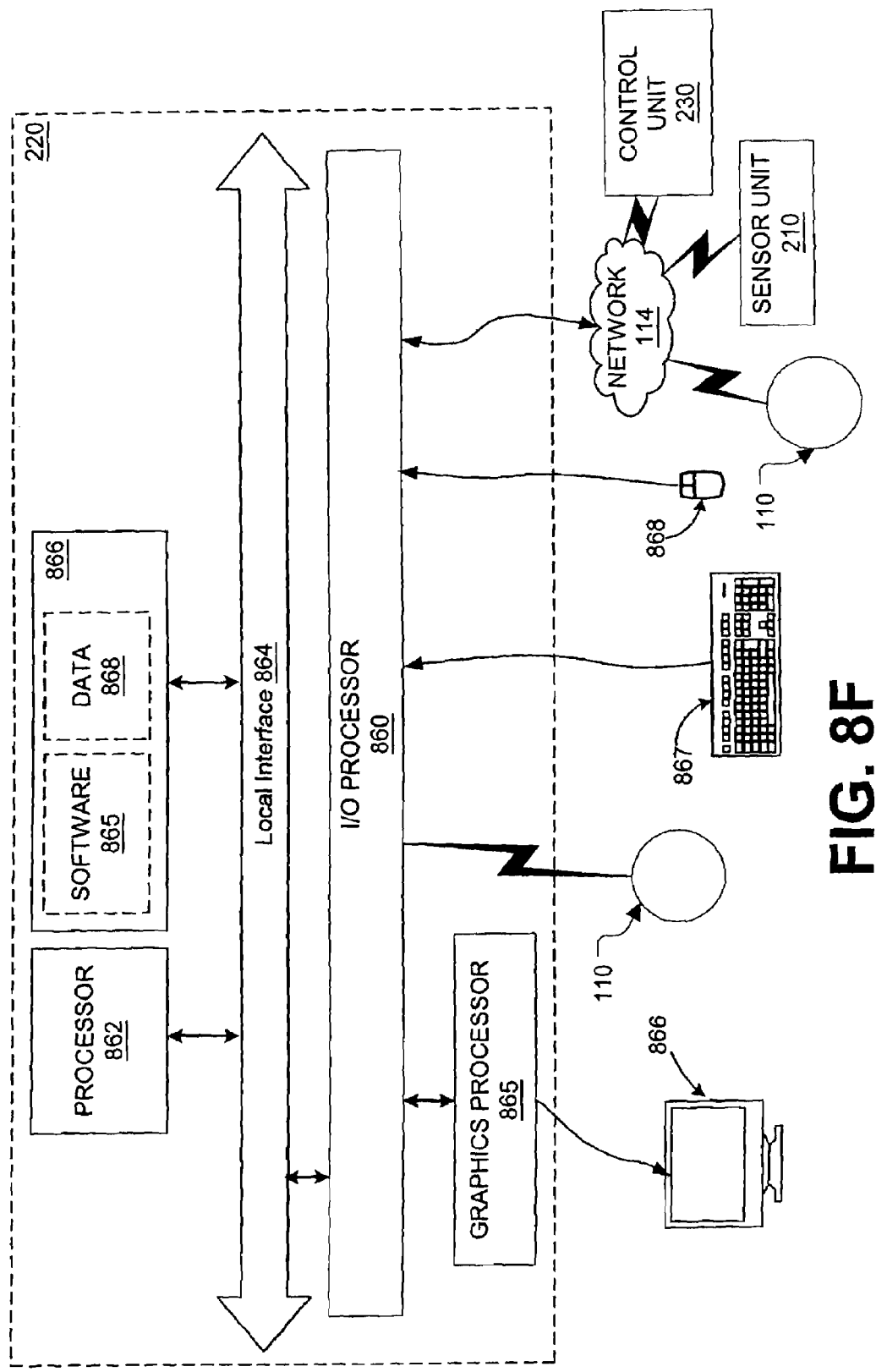
FIG. 8F is a block diagram illustrating one embodiment of the data unit 220.

FIG. 8F illustrates an embodiment of a data unit 220. In this embodiment, data unit 220 includes a processor 862, a local interface bus 864, storage memory 866 for storing electronic format instructions (software) 865 and data 868. Storage memory 866 may include both volatile and non-volatile memory. An input/output interface 860 may be provided for interfacing with and communicating data received from/to, for example, a network 114 or input devices such as a keyboard 867 or pointing device 868. Input/output interface 860 may also be configured to interface with, for example, graphics processor 865. Graphics processor 865 may be provided for carrying out the processing of graphic information for display in accordance with instructions from processor 862.

Processor 862 accesses data stored in memory 866 in accordance with, for example, software 865 stored on memory 866. Data comprising a surveillance model, as well as the surveillance database, may be stored as data 868 in memory 866. Processor 862 may be configured to receive event record data from a sensor unit 210 and to process the data contained therein to incorporate it into a surveillance model 322 (FIG. 3) representative of a given AUS 50. Processor 802 may also be configured to incorporate the event record data into a surveillance database, in accordance with software 865 stored in memory 866. Processor 862 may be further configured to carry out the functions and operations of the flowcharts shown in FIGS. 8A, 8B and 8E in accordance with software 865 stored in memory 866.

The function and operation of the processor 862 may be conducted in accordance with software 865 stored on memory 866. The software 865 may include, for example, one or more applications, configured to process event record data from a sensor unit 210, as well as command data from a control unit 230. Such processing may be carried out according to the methodology described by the flowcharts of FIG. 8A and FIG. 8B discussed above.

The flow charts of FIGS. 8A, 8B and 8E show the architecture, functionality, and operation of a possible implementation of the software 505 (FIG. 5C). In this regard, each block represents a module, segment, or portion of code, which comprises one or more executable instructions for implementing the specified logical function(s). It should also be noted that in some alternative implementations, the functions noted in the blocks may occur out of the order noted in FIGS. 8A, 8B and 8E. For example, two blocks shown in succession in FIGS. 8A, 8B and 8E may in fact be executed substantially concurrently or the blocks may sometimes be executed in the reverse order, depending upon the functionality involved.

Control Unit

FIG. 9A further illustrates a representative embodiment of control unit 230 (FIG. 3). The control unit 230 includes a visualization module 910, a video-viewing module 911, a reporting module 912 and a management module 913.

In a preferred embodiment, the control unit 230 is configured to provide for display of a surveillance model of the AUS 50. In a preferred embodiment, the control unit 230 allows a user to navigate the model via controlling such things as the point of view from which the model is viewed/displayed. The control unit 230 is further configured to display an activity icon representative of the detected activity on the surveillance model. The activity icon may consist of, for example, either graphic and/or textual information representative of detected activity. An activity icon may be overlaid on a surveillance model and viewable in conjunction with the surveillance model for a predetermined period of time, after which it ceases to be displayed. Alternatively, the activity icon may remain overlaid on the surveillance model and viewable until some predetermined event/occurrence has taken place.

Data representing the surveillance model may be stored locally on memory associated with the control unit 230, or remotely stored on memory accessible by the control unit 230 via the network 114. In a preferred embodiment, the surveillance model is a geographic information systems (GIS) format map/illustration depicting pre-existing or known attributes of an AUS.

In one embodiment, the control unit 230 is configured to request an update of detected activity information from the data unit 220. The data unit 220, in turn, provides the control unit 230 with updated event record information. In turn, the control unit 230 causes one or more activity icons, each corresponding to a particular event record, to be displayed in conjunction with the surveillance model and published to a predetermined address or otherwise displayed for viewing by an end user. In one embodiment, the activity icons are displayed in an overlaid fashion on the surveillance model.

Control unit 230 is configured to receive user input and to issue commands to the data unit 220 and the sensor unit 210 via the data unit 220. Commands may be issued by the control unit 230 based upon user input, or upon the occurrence of predetermined events/changes or other criteria.

The control unit 230 is configured to request data from the data unit 220 and output reports based on surveillance data obtained from the surveillance database 322 of data unit 220 (FIG. 3). These reports may be, for example, statistical reports based upon the surveillance data of the surveillance database 322 (FIG. 3). As further example, a report detailing all detected activity within a given time frame, of a particular type, such as movement, within the AUS, or a predetermined portion thereof, may be generated and outputted for user review and/or analysis.

The control unit 230 may also be configured to request information from the data unit 220. Such information may be requested in the form of a report based upon surveillance data contained in the surveillance database 322, as well as on detected activity within an AUS.

Similarly, the control unit 230 may be configured to receive real time streaming video depicting detected activity within the AUS 50. Such real time video may be outputted for display. In one embodiment, real time streaming video may be outputted for display in conjunction with the surveillance model representative of the AUS and thereby also provide an end-user with information depicting the relative location of the detected activity within the AUS.

FIG. 9B is a flowchart describing a process of responding to a user request, carried out by one embodiment of the control unit 230. User input is received (920). Input may be provided by, for example, a keyboard or pointing device. A command is generated based on the user input and sent to the data module 220 (922). The command may request, for example, a particular type of report to be generated. A response will then be received from the data module (924). In the case where a report was requested, the response may be in the form of data representing the requested report. The report may then be presented to the user (926). Presentation of the report may be carried out via display on a display device, of the report data. Such visualization may be generated by the visualization module in accordance with the report data received from the data unit 220.

The control unit 230 of the present invention can be implemented in hardware, software, firmware, or a combination thereof. In the preferred embodiment(s), the control unit 230 is implemented in software or firmware that is stored in a memory and that is executed by a suitable instruction execution system. If implemented in hardware, as in an alternative embodiment, the control system 230 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

Figure 9C:
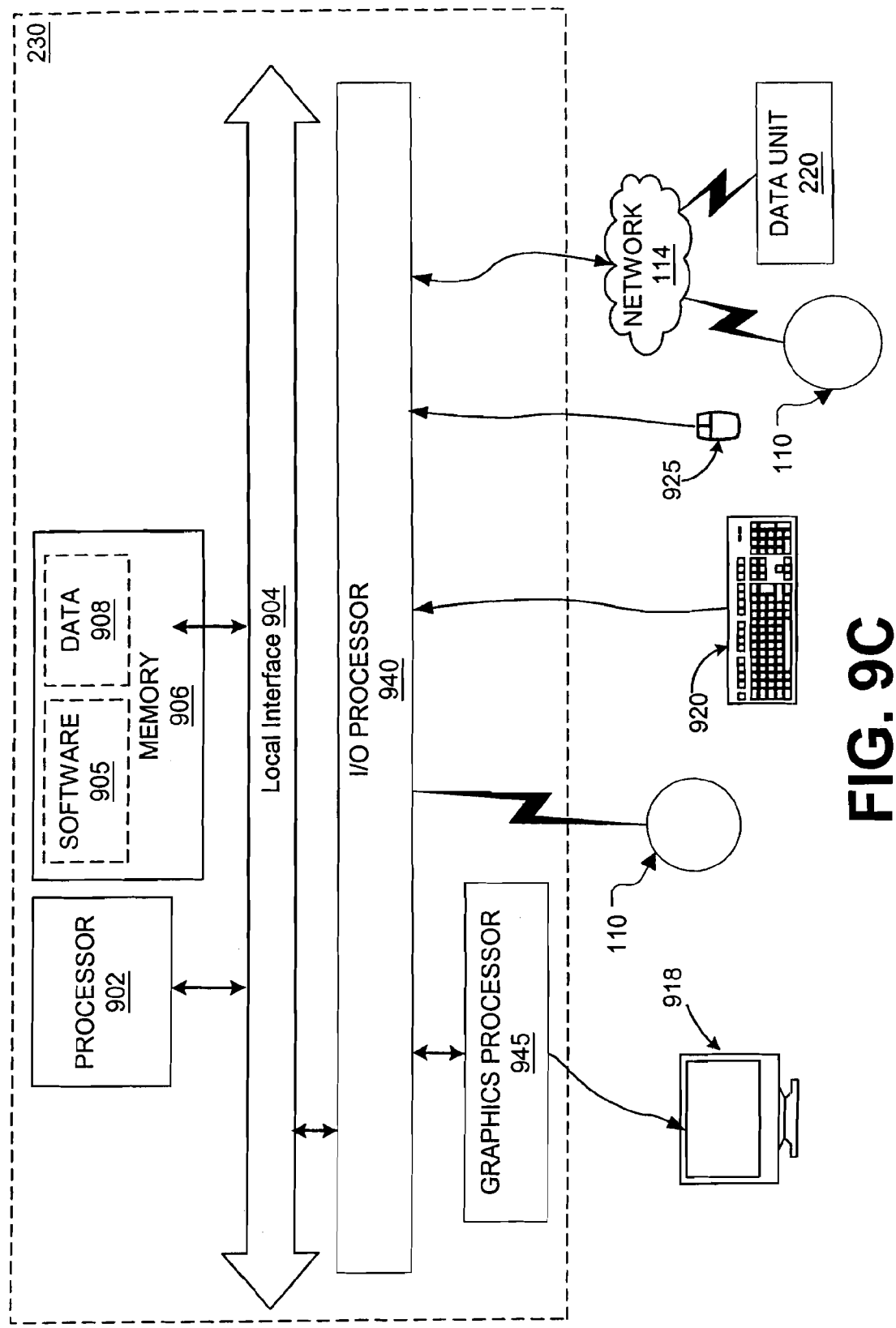
FIG. 9C is a block diagram illustrating one embodiment of the control unit 230.

FIG. 9C illustrates an embodiment of a control unit 230. In this embodiment, sensor unit 230 includes a processor 902, a local interface bus 904, storage memory 906 for storing electronic format instructions (software) 905 and data 908. Storage memory 906 may include both volatile and non-volatile memory. An input/output interface 940 may be provided for interfacing with and communicating data received from/to, for example, a network 975 or input devices such as a keyboard 920 or pointing device 925. Input/output interface 940 may also be configured to interface with, for example, graphics processor 945. Graphics processor 945 may be provided for carrying out the processing of graphic information for display in accordance with instructions from processor 902.

Processor 902 accesses data stored in memory 906 in accordance with, for example, software 905 stored on memory 906. Processor 902 may be configured to receive user input from an input device such as keyboard 920 or pointing device 925 and generate a command based upon the user input. Processor 902 may also be configured to place the command into a predetermined format, such as, for example, extensible mark-up language format, in accordance with software 905 stored in memory 916. Processor 902 may be further configured to forward the command to a data unit and to subsequently receive a response from the data unit. The processor 902 may be further configured to carry out the functions of the visualization module 910, the video viewing module 911, reporting module 912 and/or management module 913 in accordance with software 905 stored in memory 916. The software 905 may include, for example, one or more applications, configured to cause an event record to be generated and/or formatted and/or encrypted according to the methodology described by the flowchart of FIG. 9B.

The flow chart of FIG. 9B shows the architecture, functionality, and operation of a possible implementation of the software 905 (FIG. 9C). In this regard, each block represents a module, segment, or portion of code, which comprises one or more executable instructions for implementing the specified logical function(s). It should also be noted that in some alternative implementations, the functions noted in the blocks may occur out of the order noted in FIG. 9B. For example, two blocks shown in succession in FIG. 9B may in fact be executed substantially concurrently or the blocks may sometimes be executed in the reverse order, depending upon the functionality involved.

The software program stored as software 905, which comprises a listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic or non-magnetic), a read-only memory (ROM) (magnetic or non-magnetic), an erasable programmable read-only memory (EPROM or Flash memory), an optical fiber (optical), and a portable compact disc read-only memory (CDROM) (optical or magneto-optical). Note that the computer-readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

Surveillance System Examples

Figure 10A:
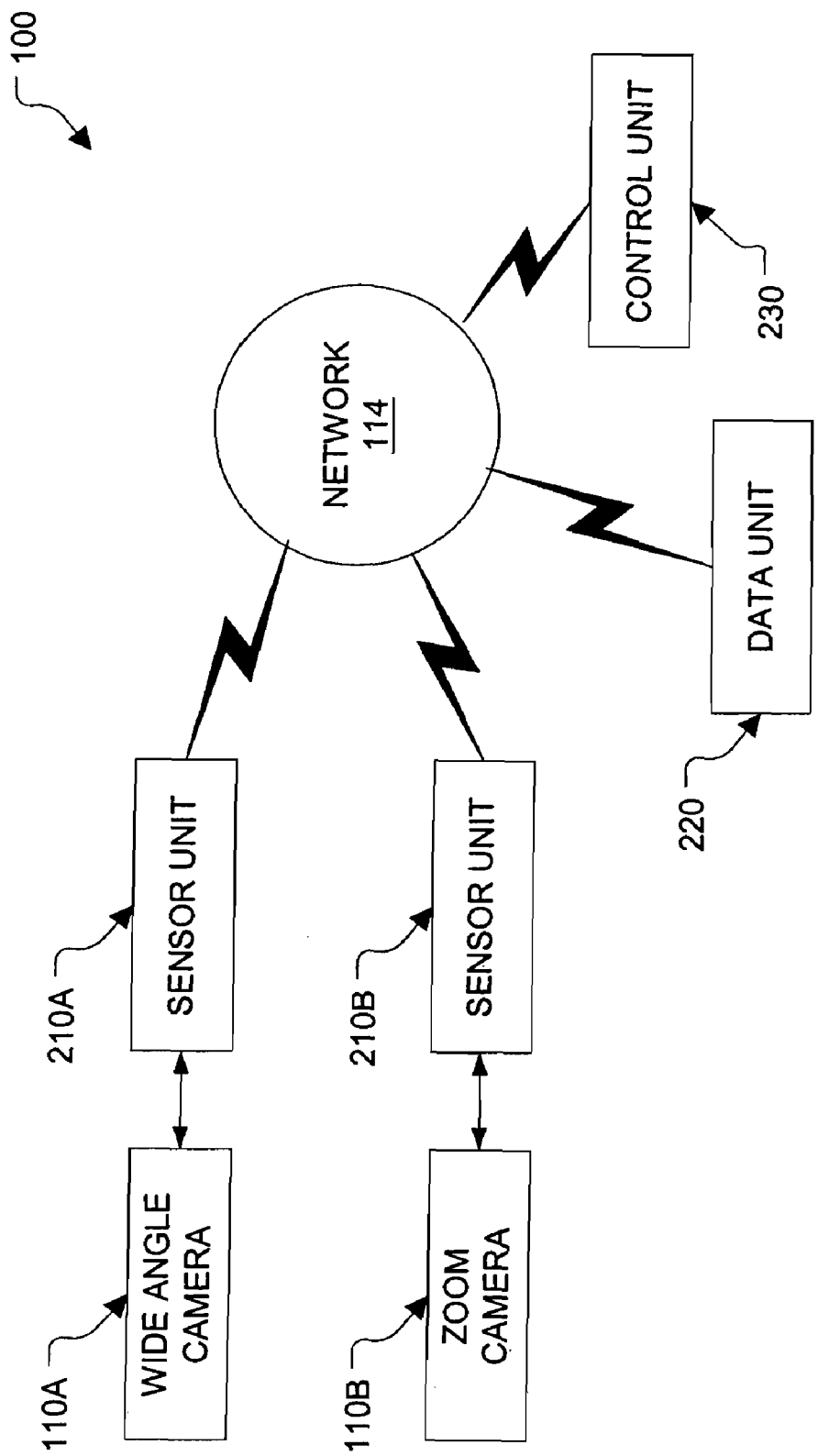
FIG. 10A is a block diagram illustrating a further embodiment of surveillance system 100.
Figure 10B:
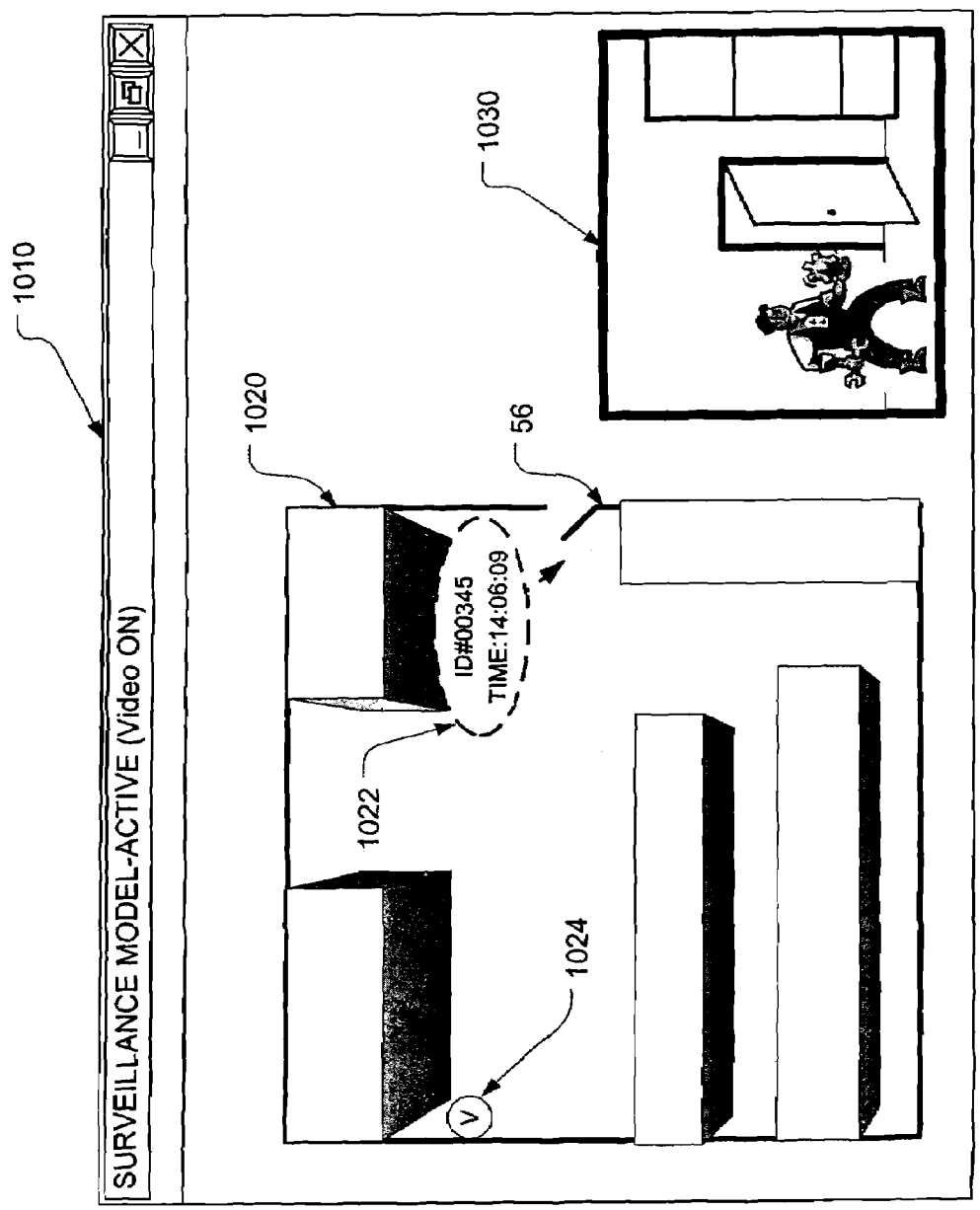
FIG. 10B is a block diagram illustrating a representative screen shot of a control panel 1010 presented by control unit 230.
Figure 10C:
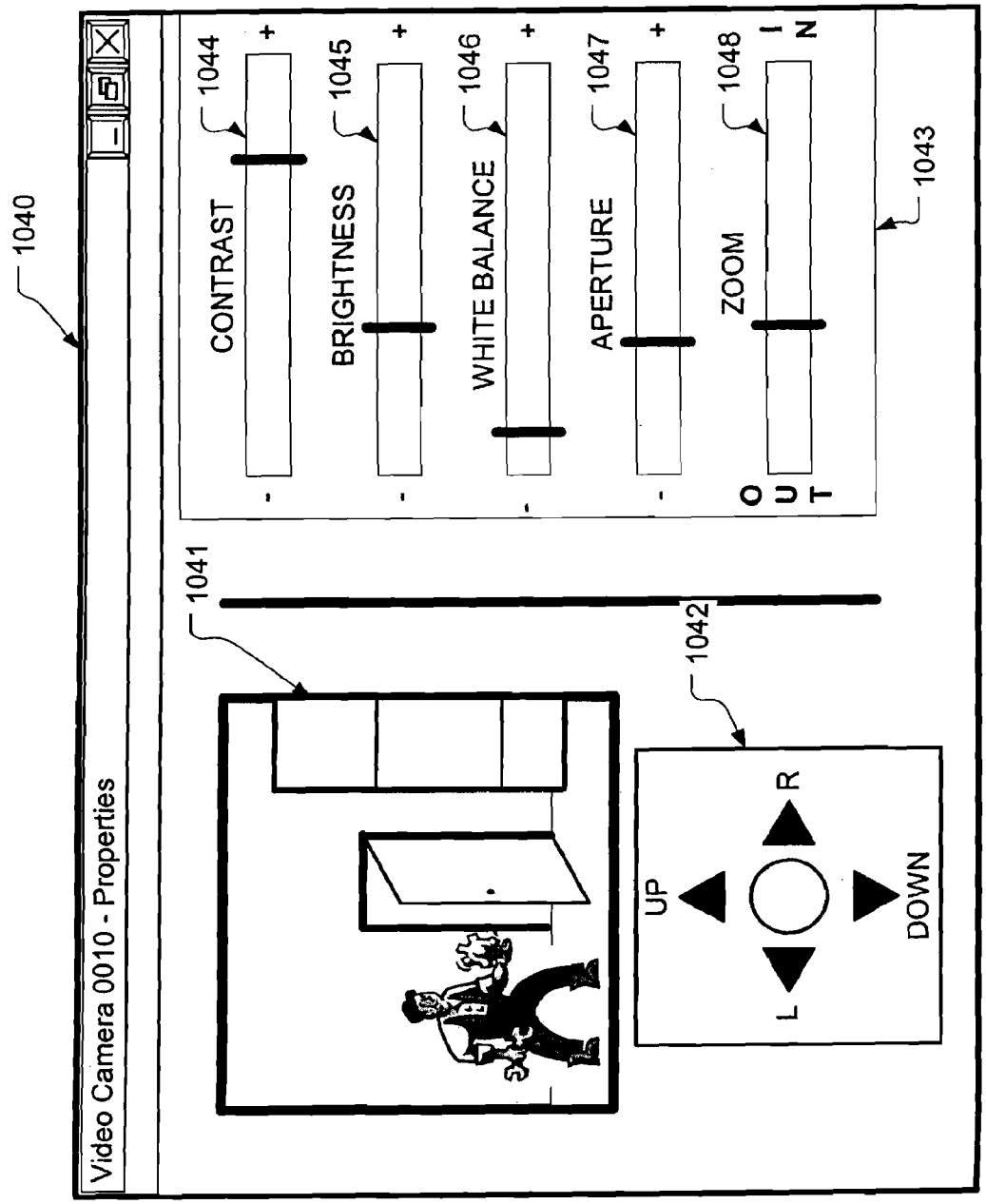
FIG. 10C shows a representative illustration of a screen shot 730 of a display of a further embodiment of a control panel that corresponds to sensor device 110B.

With reference to FIGS. 10A, 10B and 10C a configuration of surveillance system 100 (FIG. 1B) will be further discussed. FIG. 10A shows a configuration of a surveillance system 100 in which a sensor device 110A is interfaced with a sensor unit 210A and a sensor device 110B is interfaced with a sensor unit 210B. Each of the sensor units 210A and 210B are interfaced with the network 114. A data unit 220 and a control unit 230 are provided.

Sensor device 110A is configured as a video camera having wide-angle optics to provide for coverage of a wide field of view. Such a camera is useful for monitoring a large portion AUS or portion thereof. Sensor device 110B is configured as a video camera having telephoto capable optics to provide for a narrower (close-in) field of view. Such a camera is useful for close-up viewing of objects/features within an AUS.

The data unit 220 is preferably configured to generate a graphical representation (model) of the AUS and publish it to a predetermined web-site/address (surveillance web-site). Access to the web-site will typically be limited. When an event record is received, the data represented by the event record can be incorporated by the data unit into the graphical model. The web-site may then be updated to reflect the detected activity represented by the event record. By viewing the web-site, a user may be presented with a graphical representation of the AUS as well as indicators showing activity detected within the AUS. The control unit 230 will preferably be configured to access and display the surveillance model/web-site.

The sensor unit 210A may be configured to issue an alert to the control unit 230 to advise of an update to the surveillance model/surveillance web-site. Alternatively, the data unit 230 may be configured to automatically request and receive an update from the surveillance web-site, and thereby obtain a current, up-to-date status of the surveillance model for presentation/display.

The control unit 230 will preferably be configured to provide a display of the surveillance model and relevant event information. One example of a display of a screen shot presented by the control unit 230 is shown in FIG. 10B. In this example, FIG. 10B shows a screen shot 1010, which depicts a graphic representation/model 1020 of the AUS 50 (FIG. 1) as well as a live video feed window 1030. Activity icon 1022 is shown on the model 1020. This activity icon 1022 may be displayed to indicate activity that has taken place and to provide information concerning the detected activity. Sensor icon 1024 is provided to indicate the presence and relative orientation of a sensor device 110 (FIG. 3A) within the AUS. In this case, sensor icon 1024 shows a "V" to indicate that this particular sensor is a video camera. Display window 1030 may be used to display streaming video of images captured by the video camera such as, for example, sensor device 110A or 110B (FIG. 7A). This screen shot 1010 may be displayed, for example, on a display device associated with the control unit 230.

The video camera 110A monitors an AUS 50. The video camera 110A generates data representative of an image of the AUS 50. This data is provided to the sensor unit 210A. When changes in the AUS 50 are detected by the sensor unit 210A, an event record is generated and provided to the data unit 220. Data unit 220 updates the surveillance model of the AUS 50 based upon the event record, and refreshes the data by publishing the new updated surveillance model to the surveillance web-site. In one embodiment, the data unit 220 causes an activity icon 1022 (FIG. 10B) to be displayed in conjunction with the surveillance model.

The control unit 230 may be configured to maintain access to the surveillance web-site at which the surveillance model 1020 is published. This surveillance model is then preferably displayed on a display device associated with the control unit 230. A user may view the displayed surveillance model and note the activity icon 1022. In this example, the activity icon indicates that some activity has been detected in relation to a door 56. In turn, the user of control unit 230 may provide input to the control unit 230 to request display of the live video feed corresponding to the activity represented by the activity icon 1022. This request is forwarded to the data unit 220, which in turn responds by streaming the video feed, received from the video camera 110A, to the control unit 230. Control unit 230 is configured to then display the video feed in, for example, the live video feed window 1030.

The control unit 230 may be further configured to receive input from a user that requests, for example, the adjustment of the orientation of the video camera 110A or the movement of the position of the video camera 110A. This input may be provided by an input type device such as, for example, a keyboard, pointing device, touch screen display or joystick type device. In turn the control unit 230 issues a command to the data unit 220. The data unit 220 forwards these commands to the sensor unit 210A. Sensor unit 210A then translates the command, if necessary, into appropriate control signals that can be used to control, for example, an adjustable gimbal (not shown) associated with the video camera 110A. Based upon the control signals from the sensor unit 210A, the gimbal may be adjusted and thereby adjust the orientation of the video camera 110A.

In another embodiment, sensor unit 210A is configured to receive video input from the sensor device 110A. The sensor unit 210A is configured to detect "activity" within the AUS 50. Activity within the AUS 50 will typically comprise movement of one or more objects within the AUS.

The sensor unit 210A may also be configured to determine the coordinates or general orientation of the changes within the AUS. The data unit 220 causes graphic or textual information corresponding to the activity represented by the event record to be generated as an "activity icon" for overlay onto a model of the AUS (surveillance model). The surveillance model as well as the activity icon overlay, may then be published by the data unit 220 to a predetermined address for access/distribution.

In turn, the data unit 220 causes a command to be issued to sensor unit 210B that tells it to adjust the orientation of the sensor device 110B. By adjusting the orientation of the sensor device 110B, the activity at the location specified by the event record can be brought into view of the sensor device 110B. The sensor unit 210B in turn generates a control signal in accordance with the command from the data unit 220. In response to the control signal, the orientation of the sensor device 110B is adjusted.

In a further embodiment, the sensor unit 210B may be configured to process the video received from the sensor device 110B and to classify the detected object that is the subject of the activity detected by the sensor unit 110A. In this embodiment, the sensor unit 210B may be configured to classify the object by carrying out, for example, a pattern recognition process. Such a pattern recognition process may be carried out based upon data that may be included in a local database associated with the sensor unit 210B, in which reference data identifying known patterns of known objects may be stored. Once the sensor unit 210B has classified the object that is the subject of the detected activity, the sensor unit 220B will preferably generate a second event record that specifies the time, location and classification of the object that was detected at the specified location. In the case where the sensor device 220B is unable to actually classify the object, an event record may still be generated which indicates the classification of the object as, for example, "unknown". This event record is then forwarded to the data unit 220, which in turn will update the surveillance database 322 with the new event record information. Further, the data units 220 will preferably cause an activity icon corresponding to the activity represented by the new event record to be generated for overlay onto/display in conjunction with the surveillance model. The surveillance model as well as the activity icon may then be published by the data unit 220 to a predetermined address for access and distribution. Typically, the predetermined address may be accessed by an end user via control unit 230.

One further example of a process for classifying a detected object that may be carried out by sensor unit 210A and/or 210B has been described above with respect to FIG. 4E. It will further be recognized that while FIG. 4E has been discussed above in relation to the configuration and operation of sensor unit 210, such process and functionality could easily be incorporated into the sensor device 110A and/or the sensor device 110B.

In a further embodiment of data unit 220, the data unit 220 may be configured to cause an alarm/alert to be issued. This alarm may be issued to, for example, the control unit 230. In turn, in response to the alarm, an end user may access the model of the AUS published by the data unit 220 and view activity icon(s) indicative of detected activity within the AUS. In this embodiment, the activity icon corresponding to the detected activity is "active" (i.e. hyperlinked) and may be activated, for example, by clicking on the activity icon displayed in conjunction with the model of the AUS. By activating the activity icon, a device control panel corresponding to the sensor device that detected the activity may be accessed and displayed via control unit 230.

FIG. 10C shows a representative illustration of a display of a device control panel 1040 that corresponds to sensor device 110B (FIG. 10A). This device control panel 1040 may be accessed and displayed via a display device associated with, for example, a control unit 230. In this example, the field of view captured by the sensor device 110B is displayed in window 1041. In this window, real-time streaming video of the activity being captured by the sensor device 110B can be viewed by an end user.

Control window 1042 displays relevant controls for controlling the orientation of sensor device 110B. In this case, the controls for moving the sensor device "UP", "DOWN", Left ("L") or Right ("R") are provided. Control window 1043 displays relevant controls for adjusting properties of the sensor device 110B, such as, for example, contrast 1044, brightness 1045, white balance 1046, aperture size 1047 and/or lens zooming functions 1048. By interacting with a displayed control (1042-1048), a user may adjust the orientation of the sensor device 100B so as to, for example, obtain a better/different view of the activity captured by the sensor device 110B. A user may interact with a control in control window 1042 or 1043 by, for example, using a pointing device to click on a displayed control.

In one embodiment, the video output from the sensor device 110B is provided to the sensor unit 210B, which in turn converts the video signal into a predetermined streaming video format. This streaming video may then be outputted to the data unit 220 which may make it available for end user viewing by publishing it to a predetermined address that can be accessed by an end user. Typically, the predetermined address may be accessed by an end user via, for example, control unit 230. However, data unit 220 and/or sensor unit 210 may also be configured to allow a user to access the predetermined address.

Figure 10D:
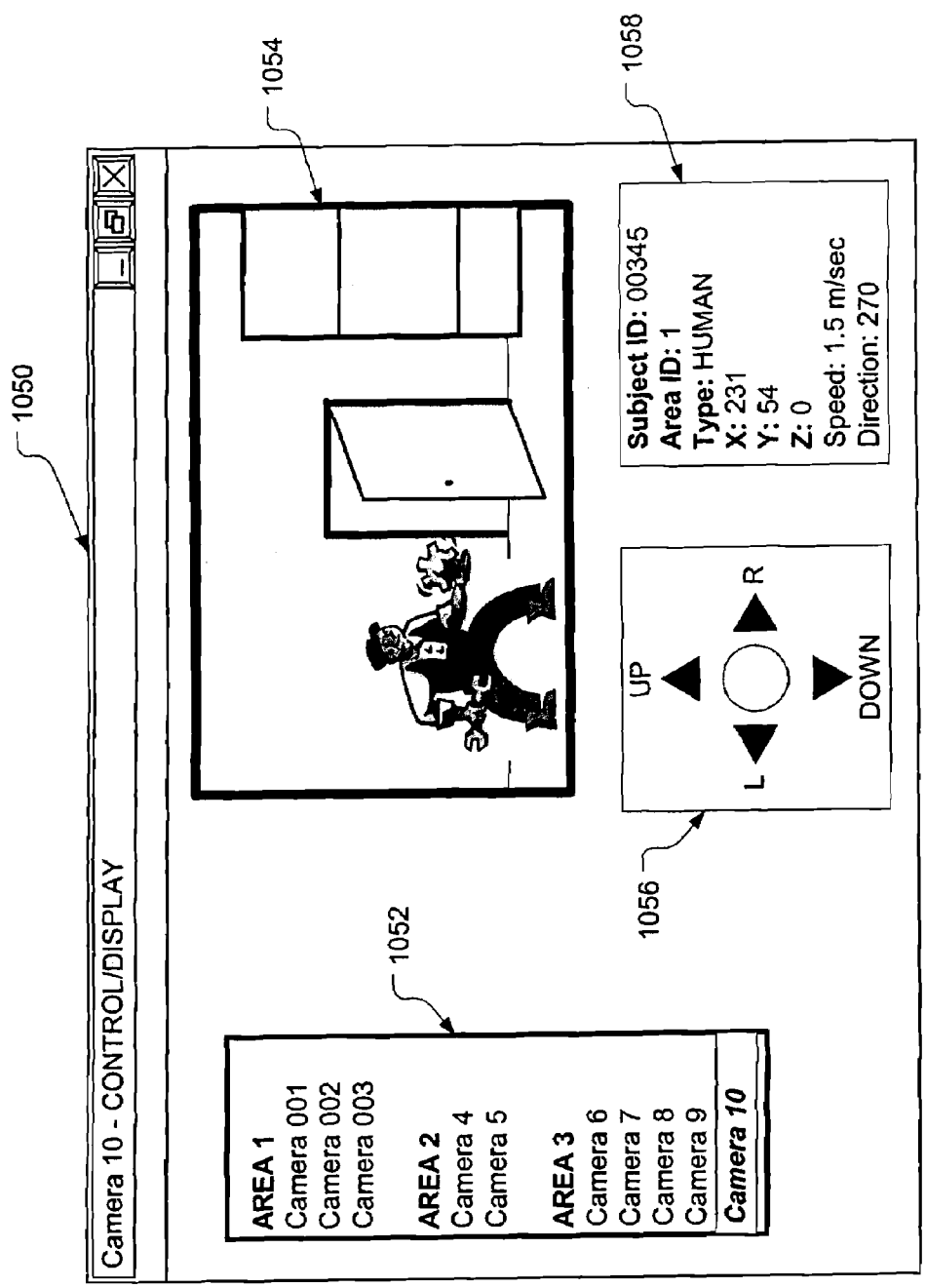
FIG. 10D is a block diagram illustrating a representative screen shot of a control panel 1010 presented by control unit 230.

FIG. 10D shows a further illustration of an embodiment of a device control panel 1050 that may be accessed and/or displayed by control unit 230. In this embodiment, a display window 1052 is provided for displaying a list of one or more sensor devices that are "active" and/or available to an end user. In this example, the sensor devices are cameras and are denoted as "Camera 1" through "Camera 10". An end user may select a particular camera by, for example, highlighting or clicking on the name of the particular camera shown in the display window 1052. In this example camera 10 has been selected. A display window 1054 is provided and displays a real time display of streaming video representative of the AUS within the field of view of the Camera 10. A display window 1056 is provided which displays active controls that are available to the end user for purposes of controlling/adjusting the orientation and/or zoom of the Camera 10. A display window 1058 is provided which displays information concerning an object within the field of view of the "Camera 10". In this example, the display window shows information identifying the object type and the location of the object. Other information may also be provided as may be desired or available.

Variations on what information/control panels will be presented for display are possible. Such variations may include any one or more of the features or controls illustrated in FIG. 10B and FIG. 10C. Further, additional features or control elements other than those shown in FIG. 10B and FIG. 10C are possible.

Figure 11:
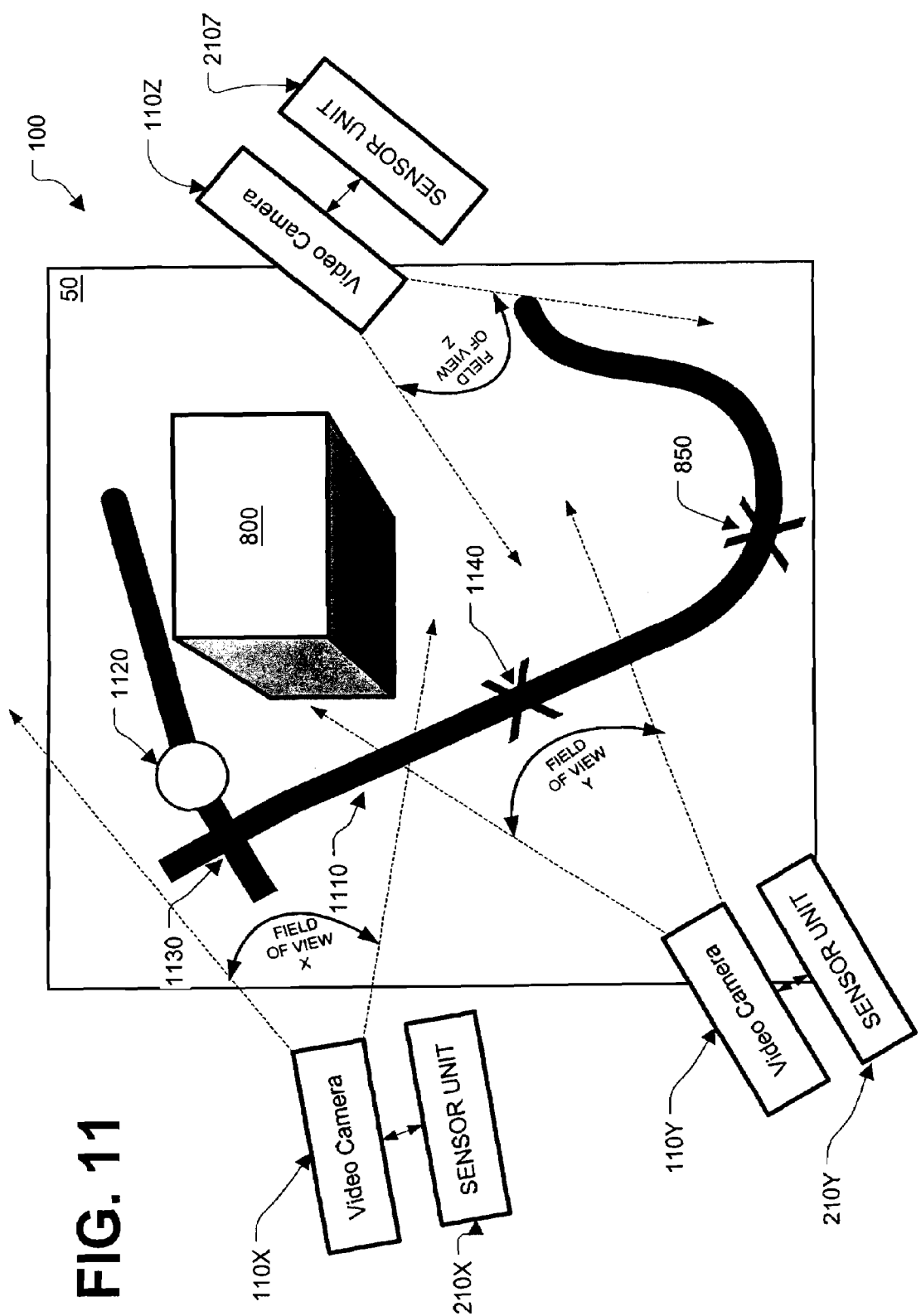
FIG. 11 is a diagram for further explaining the configuration and operation of one embodiment of the surveillance system 100.

FIG. 11 shows a diagram illustrating the general arrangement of sensor devices 110X, 110Y and 110Z in relation to an AUS 50. The AUS 50 is monitored by sensor devices 110X, 110Y and 110Z. In this example, each of the sensor devices 110X, 110Y and 110Z are configured as video cameras. Each video camera is monitoring a particular portion of the AUS 50. This portion corresponds to the field of view that each video camera has of the AUS 50. It can be seen that video camera 110X has a field of view X, while video camera 110Y has a field of view Y and video camera 110Z has a field of view Z. Each video camera can capture activity that occurs only within its respective field of view.

In this example, the AUS 50 includes a building 1100. There is also a vehicle 1120, which is traveling along a roadway 1110. As the vehicle 1120 travels along the roadway 1110 toward intersection 1130, it is within the field of view X of the video camera 110X, and an image thereof is captured by the video camera and outputted as sensor data. This sensor data is transmitted to an associated sensor unit 210X. As the vehicle 1120 travels along the roadway 1110 from the intersection 1130 and toward the point 1140, the vehicle 1120 moves from within the field of view X of the video camera 110X and into the field of view Y of video camera 110Y. An image thereof is captured and outputted as sensor data to an associated sensor unit 210Y. As the vehicle 1120 continues to travel toward point 1150, it moves from within the field of view Y of the video camera 110Y and into the field of view Z of video camera 110Z. The video camera 110Z then captures imagery of the vehicle 1120 and outputs it as sensor data to an associated sensor unit 210Z.

Each of the sensor units 210X, 210Y and 210Z are preferably configured to detect the movement of the vehicle 1120 and to generate an event record representing the travel of the vehicle 1120 through the respective field of view of the associated sensor device. In one embodiment, each of the sensor units 210X, 210Y and 210Z may be configured to classify the vehicle 1120 and incorporate such classification information into an event record. Further, each sensor unit may be configured to determine and incorporate into the event record, the speed and/or direction of the vehicle's travel within the AUS 50. Each of the sensor units 210X, 210Y and 210Z will forward event records corresponding to the travel of the vehicle 1120 within the AUS 50, to a data unit 230 (not shown). The data unit 230 will preferably be configured to correlate the data contained in each of the event records received from the sensor units 210X, 210Y and 210Z and make further determinations about the vehicle 1120, such as, for example, the total amount of time the vehicle 1120 spent within the AUS 50; the average speed and/or direction of the vehicle 1120 while in the AUS and/or the rate of acceleration of the vehicle 1120.

In one embodiment, the sensor unit 210 is configured to incorporate one or more features and/or functions of the sensor device 110 as discussed herein. In a further embodiment, the sensor unit 210 is configured to incorporate one or more features and/or functions of the data unit 220 as discussed herein. In yet a further embodiment, the sensor unit 210 is configured to incorporate one or more features and/or functions of the control unit 230 as discussed herein.

In one embodiment, the data unit 220 is configured to incorporate one or more features and/or functions of the sensor device 110 as discussed herein. In a further embodiment, the data unit 220 is configured to incorporate one or more features and/or functions of the sensor unit 210 as discussed herein. In yet a further embodiment, the data unit 220 is configured to incorporate one or more features and/or functions of the control unit 230.

In one embodiment, the control unit 230 is configured to incorporate one or more features and/or functions of the sensor device 110. In a further embodiment, the control unit 230 is configured to incorporate one or more features and/or functions of the sensor unit 210. In yet a further embodiment, the control unit 230 is configured to incorporate one or more features and/or functions of the data unit 220.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A sensor unit for utilization in a surveillance system, wherein the sensor unit comprises:
   a processor, the processor being configured to receive raw sensor data from at least one sensor device, wherein the raw sensor data is used by the processor in order to determine if there is a detected activity in an area under surveillance,
   further, the processor generates an event record in response to the received raw sensor data and upon a determination that there is detected activity in an area under surveillance, wherein the event record comprises data relating to the location of the detected activity within the area under surveillance; and
   a sensor unit controller, the sensor unit controller being configured to receive raw sensor data from the at least one sensor device and further being configured to transmit control commands to the sensor device.

2. The sensor unit of claim 1, wherein the processor comprises object and activity classification reference data.

3. The sensor unit of claim 2, wherein the processor is further configured to utilize the raw sensor data and the activity classification data to classic the activity that is detected within an area under surveillance.

4. The sensor unit of claim 3 wherein the processor is further configured to utilize the raw sensor data in conjunction with the object classification data to classify an object that is detected within an area under surveillance.

5. The sensor unit of claim 4, wherein the sensor unit controller is configured to receive and transmit control signals from an exterior control unit to the sensor device.

6. The sensor unit of claim 5, wherein the processor is further configured to determine environmental factors of a location that a sensor device is situated and further to correct for any effects the environmental factors may have had upon the raw sensor data.

7. The sensor unit of claim 6, wherein the processor transmits the generated event record to a data unit.

8. The sensor unit of claim 7, wherein the sensor unit comprises at least one sensor device.

9. The sensor unit of claim 8, wherein the sensor device comprises a video camera.

10. The sensor unit of claim 9, wherein the video camera is responsive to infrared radiation.

11. The sensor unit of claim 6, wherein the sensor unit controller transmits the generated event record to a data unit.

12. A method for collecting and processing surveillance data within a sensor unit, the method comprising the steps of:
    receiving raw sensor data from a sensor device, wherein the raw sensor data represents data gathered from a monitored area under surveillance;
    analyzing the raw sensor in order to determine if the sensor data indicates that an activity has occurred in the area under surveillance;
    generating an event record that includes data regarding the activity if a determination has been made that an activity has occurred, wherein the event record comprises data relating to the location of the activity within the area under surveillance;
    transmitting the event record to a data unit; and
    transmitting control commands to the sensor device.

13. The method of claim 12, further comprising the step of classifying detected objects that are identified as being detected within the area under surveillance.

14. The method of claim 13, wherein the step of generating an event record further comprises the step of utilizing data regarding the classified detected objects if a determination has been made that an activity has occurred.

15. The method of claim 14, wherein the step of analyzing the raw sensor data to determine if an activity has occurred comprises the step of determining if there has been any motion detected within an area under surveillance.

16. The method of claim 15, wherein the step of classifying detected objects further comprises the step of classifying the detected objects based upon known object types.

17. The method of claim 15, wherein the step of transmitting control commands to the sensor device comprises configuring a sensor unit controller to receive and transmit control signals from an exterior control unit to the sensor device.

18. A computer program product that includes a computer readable medium useable by a processor, the medium having stored thereon a sequence of instructions, when executed by a processor, causes the processor to execute the steps of:

receiving raw sensor data from a sensor device, wherein the raw sensor data represents data gathered from a monitored area under surveillance;

analyzing the raw sensor in order to determine if the sensor data indicates that an activity has occurred in the area under surveillance;

classifying detected objects based upon known object-types objects that are identified as being detected within the area under surveillance;

generating an event record that includes data regarding the activity and the classified detected object if a determination has been made that an activity has occurred, wherein the event record comprises data relating to the location of the detected activity within the area under surveillance;

transmitting the event record to a data unit; and transmitting control commands to the sensor device.

19. The computer program product of claim 18, wherein the step of analyzing the raw sensor data to determine if an activity has occurred comprises the step of determining if there has been any motion detected within an area under surveillance.

20. The computer program product of claim 19, wherein the step of classifying detected objects further comprises the step of classifying the detected objects based upon known object types.

21. The computer program product of claim 20, wherein the step of transmitting control commands to the sensor device comprises configuring a sensor unit controller to receive and transmit control signals from an exterior control unit to the sensor device.

* * * * *